US011136873B2

(12) United States Patent
Renick

(10) Patent No.: US 11,136,873 B2
(45) Date of Patent: Oct. 5, 2021

(54) SKID MOUNTED OIL WELL PRODUCTION PROCESSING SYSTEM

(71) Applicant: Kustom Koncepts, Inc., Casper, WY (US)

(72) Inventor: Michael Renick, Kountze, TX (US)

(73) Assignee: Kustom Koncepts, Inc., Casper, WY (US)

( * ) Notice: Subject to any disclaimer, the term of this patent is extended or adjusted under 35 U.S.C. 154(b) by 0 days.

(21) Appl. No.: 15/951,167

(22) Filed: Apr. 11, 2018

(65) Prior Publication Data
US 2018/0306018 A1 Oct. 25, 2018

Related U.S. Application Data

(60) Provisional application No. 62/483,988, filed on Apr. 11, 2017.

(51) Int. Cl.
*E21B 43/00* (2006.01)
*E21B 43/34* (2006.01)
(Continued)

(52) U.S. Cl.
CPC ............ *E21B 43/34* (2013.01); *E21B 7/02* (2013.01); *E21B 19/16* (2013.01)

(58) Field of Classification Search
CPC .... E21B 19/16; E21B 43/00; E21B 43/34–40; E21B 7/02–028;
(Continued)

(56) References Cited

U.S. PATENT DOCUMENTS 3,603,617 A   9/1971 Lochridge
3,891,237 A * 6/1975 Allen ...................... B60D 1/00
                                                  172/275
(Continued)

FOREIGN PATENT DOCUMENTS

CN   201461291   5/2010
CN   202384512   8/2012
(Continued)

OTHER PUBLICATIONS

United States Patent and Trademark Office; PCT International Search Report, issued in connection to PCT/US18/27198; dated Aug. 27, 2018; 4 pages; US.
(Continued)

*Primary Examiner* — T. Bennett McKenzie
(74) *Attorney, Agent, or Firm* — Greenberg Traurig, LLP; Dwayne Mason; Matthew Browning

(57) ABSTRACT

A modular skid mounted oil production system, comprising multiple skid sections that are connectable via alignment pins coupled to the skid beam structure. The alignment pins having a fork connector that is connected to a knife connector. When the skid sections are connected, the piping, electrical, and pneumatic tubing connectors are connectable to the other corresponding skid piping, electrical, and pneumatic tubing connectors without the need for welding or field construction of connecting components. The modular skid oil production system is capable of expansion or contraction as required by the operation of the system. For example the system includes removing a skid section having a larger separator and replacing it with a skid section having a smaller separator, without the need of welding or field construction of connecting components.

24 Claims, 24 Drawing Sheets

(51) Int. Cl.
*E21B 19/16* (2006.01)
*E21B 7/02* (2006.01)

(58) Field of Classification Search
CPC ............... B60D 1/00–665; B60D 3/00; B60D 5/00–006; B60D 7/00; Y10T 403/32877; Y10T 403/32918–32934
USPC ............... 96/186; 280/477–479.3, 504–515
See application file for complete search history.

(56) References Cited

U.S. PATENT DOCUMENTS

| | | | | |
|---|---|---|---|---|
| 4,005,922 | A | * | 2/1977 | Burkhart .............. H01R 13/512 439/465 |
| 4,120,362 | A | | 10/1978 | Chateau et al. |
| 4,194,857 | A | | 3/1980 | Chateau et al. |
| 4,359,089 | A | | 11/1982 | Strate et al. |
| 4,666,340 | A | | 5/1987 | Cox |
| 4,779,677 | A | * | 10/1988 | Cobb .................... E21B 43/34 137/172 |
| 5,415,776 | A | * | 5/1995 | Homan ................. B01D 17/00 210/519 |
| 7,004,511 | B2 | | 2/2006 | Barron et al. |
| 7,207,079 | B2 | | 4/2007 | Kennedy |
| 9,222,494 | B2 | | 12/2015 | Roach et al. |
| 9,570,890 | B2 | | 2/2017 | Parr |
| 2003/0141054 | A1 | * | 7/2003 | Wade ..................... E21B 43/00 166/250.01 |
| 2004/0055249 | A1 | | 3/2004 | Kennedy |
| 2004/0239114 | A1 | | 12/2004 | Barron et al. |
| 2005/0077235 | A1 | | 4/2005 | Rhodes |
| 2008/0128400 | A1 | | 6/2008 | Michels et al. |
| 2010/0070182 | A1 | | 3/2010 | Bieker et al. |
| 2010/0206560 | A1 | * | 8/2010 | Atencio .................. E21B 34/00 166/250.15 |
| 2011/0232543 | A1 | | 9/2011 | Burroughs et al. |
| 2011/0316255 | A1 | * | 12/2011 | Staples .................... B60D 1/02 280/510 |
| 2013/0194059 | A1 | | 8/2013 | Parr |
| 2013/0317766 | A1 | * | 11/2013 | Decker ................ G01F 23/0076 702/55 |
| 2014/0196884 | A1 | | 7/2014 | Roach et al. |
| 2015/0216072 | A1 | | 7/2015 | Parr |
| 2016/0276813 | A1 | | 9/2016 | Parr |

FOREIGN PATENT DOCUMENTS

| | | |
|---|---|---|
| CN | 202810718 | 3/2013 |
| CN | 203560585 | 4/2014 |
| CN | 203798391 | 8/2014 |
| CN | 105239993 | 1/2016 |
| CN | 105773108 | 7/2016 |
| CN | 205690681 | 11/2016 |
| CN | 205785371 | 12/2016 |
| DE | 10144121 | 5/2002 |
| EP | 1128998 | 9/2001 |
| EP | 1262700 | 12/2005 |
| EP | 2572135 | 3/2013 |
| WO | 86/03252 | 6/1986 |
| WO | 2013/022501 | 2/2013 |
| WO | 2018/191441 | 10/2018 |

OTHER PUBLICATIONS

United States Patent and Trademark Office; PCT Writen Opinion of the International Searching Authority, issued in connection to PCT/US18/27198; dated Aug. 27, 2018; 6 pages; US.

GNSolidsControl.com; "3 Phase Separator-Liquid/Liquid/Gas Separation internals" [online]; Jan. 12, 2018; 1 page. http://www.gnsolidscontrol.com/drilling/3-phase-separator-liquid-liquid-gas-separation-internals/.

U.S. Department of Transportation, Federal Highway Administration; Chapter 14: Connections-Covered Bridges Manual; Apr. 2005; 30 pages; Publication No. FHWA-HRT-04-098; US.

United Sates Patent and Tramdemark Office; PCT Invitation to Pay Additional Fees and, Where Applicable, Protest Fee, issued in connection to PCT/US18/27198; dated Jun. 25, 2018; US.

Modular Automation for Multi-Stage and Flexible Water Treatmen: Plants based on theLego principle; May 18, 2016; 4 pages; downloaded from: http://cpp.industrie.de/allgemein/plants-based-on-thelego-principle/#.

Jacinto, Joan; How TIA Enables Skid-Based Applications for the Oil and Gas Industry; 7 pages; Jan. 29, 2015; downloaded from: http://www.totallyintegratedautomation.com/2015/01/tia-enables-skid-based-applications-oil-gas-industry/.

* cited by examiner

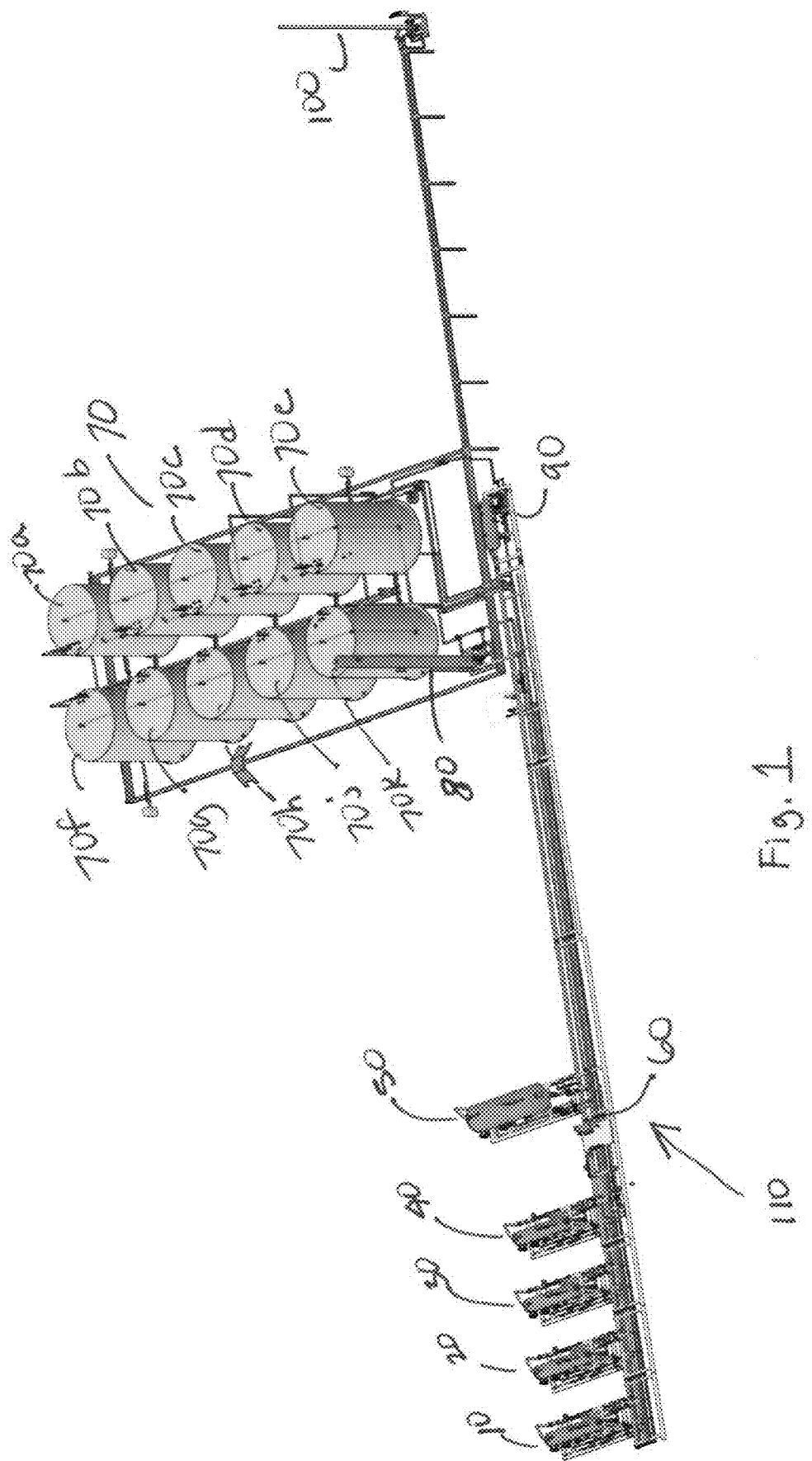

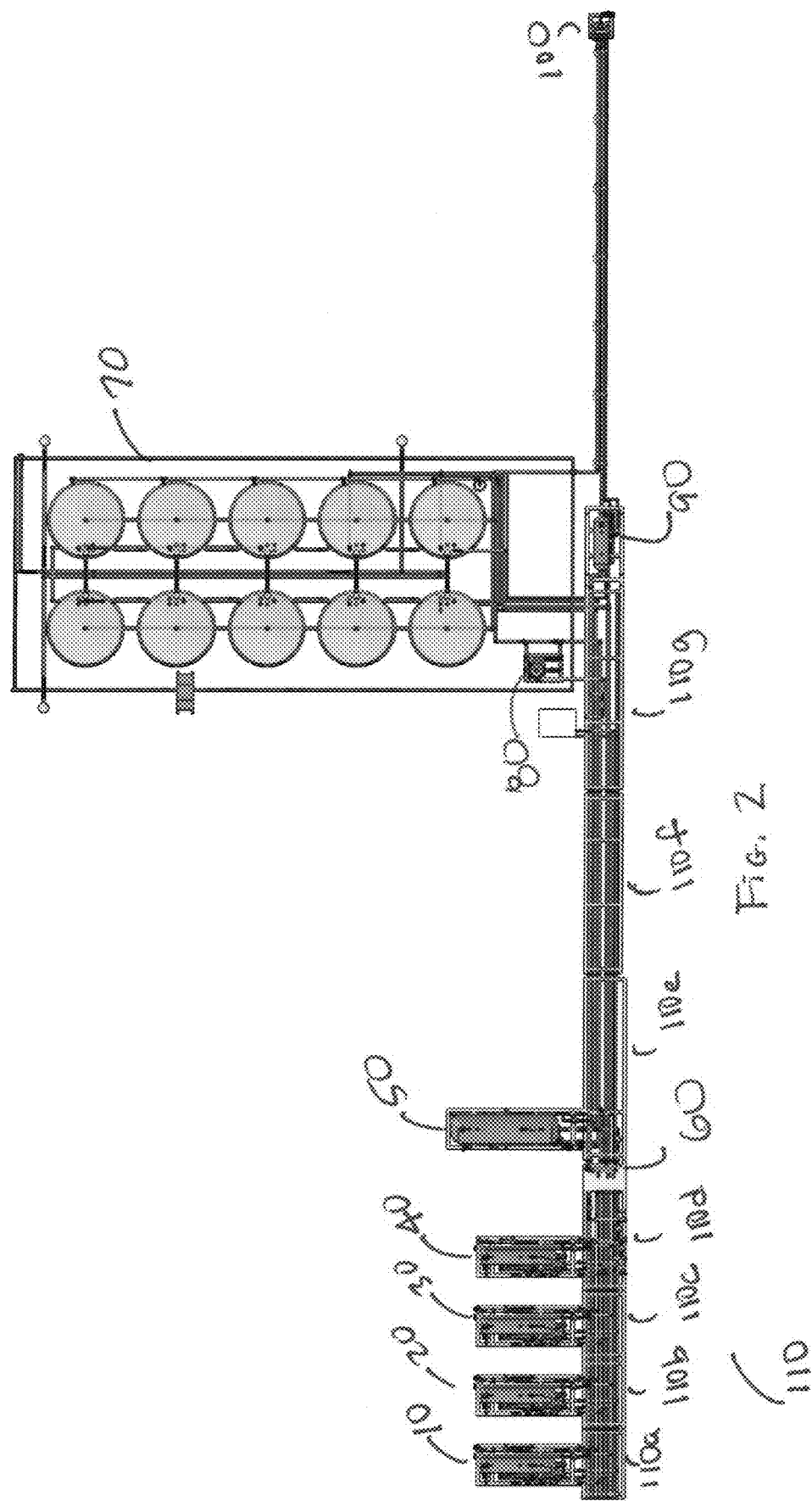

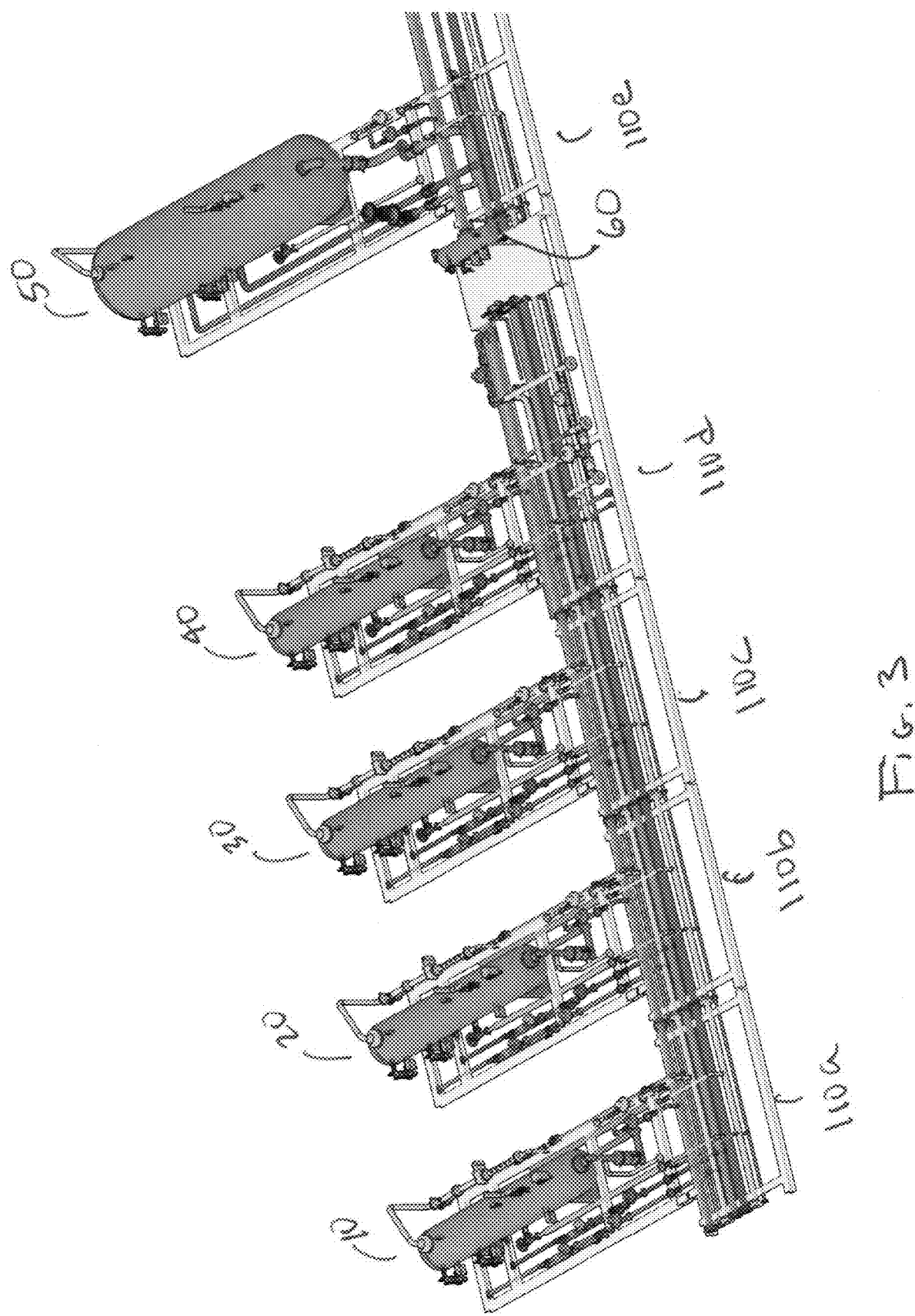

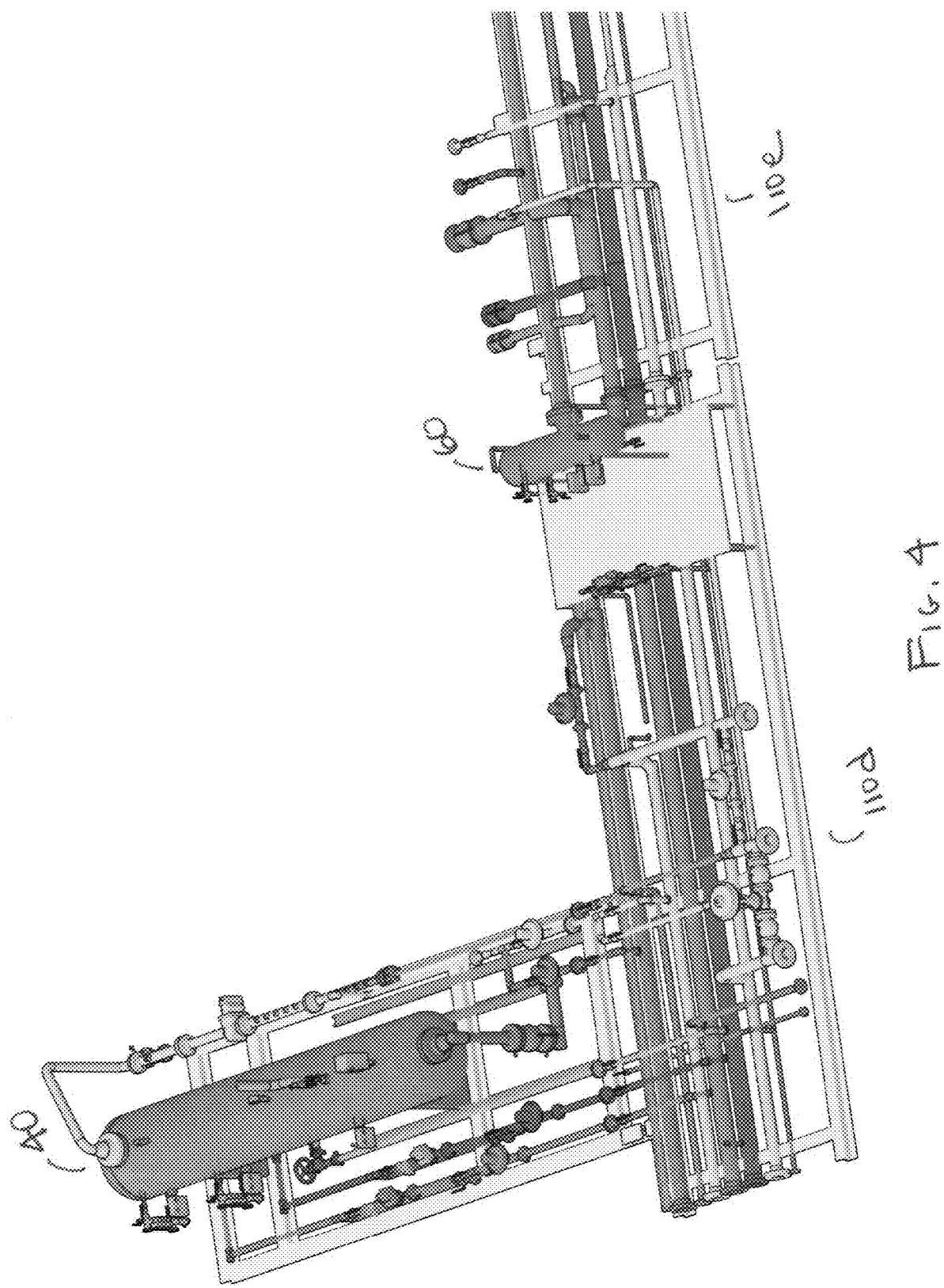

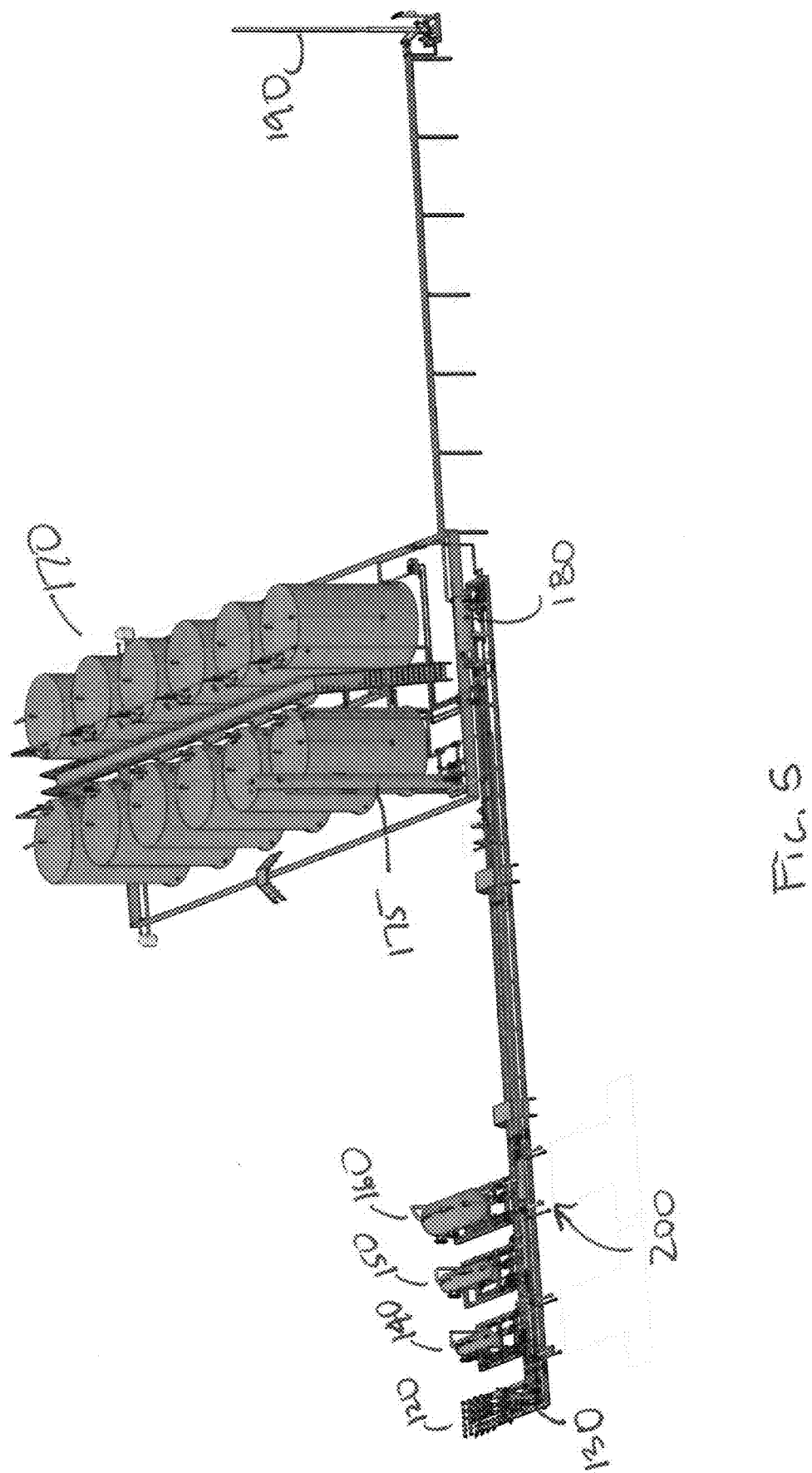

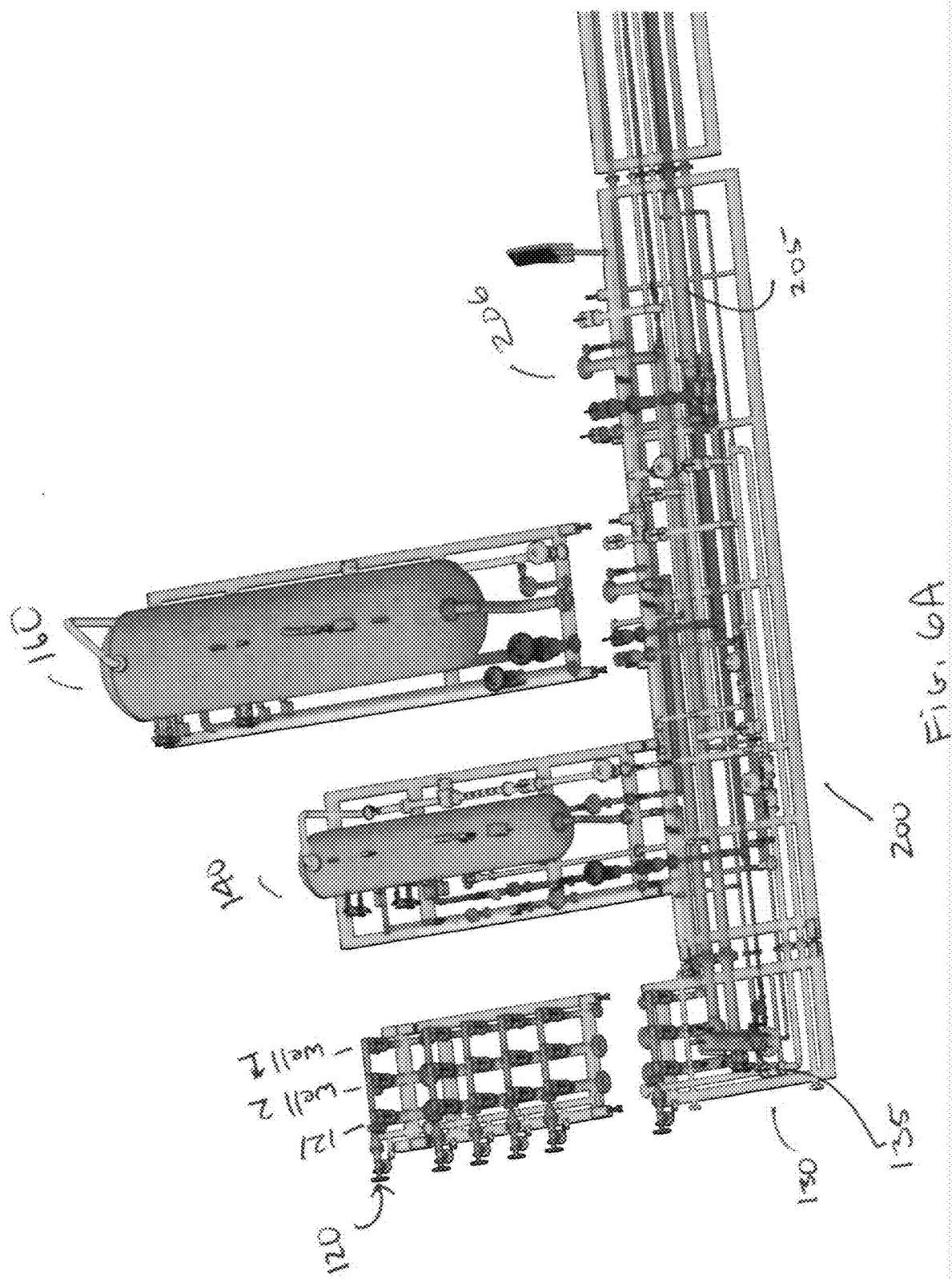

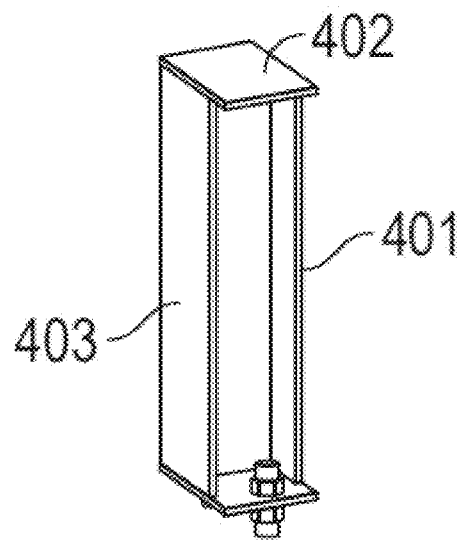
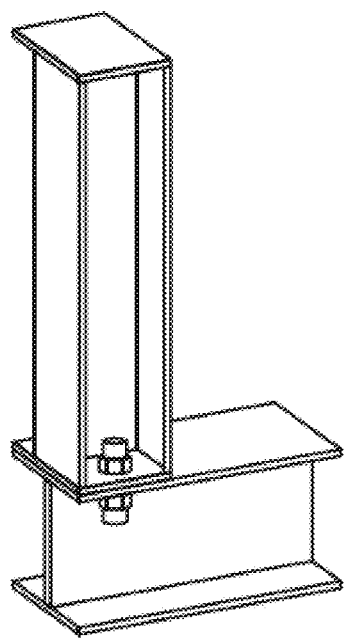
FIG. 17

SKID MOUNTED OIL WELL PRODUCTION PROCESSING SYSTEM

CROSS-REFERENCE TO RELATED APPLICATIONS

This application claims the benefit, and priority benefit, of U.S. Provisional Patent Application Ser. No. 62/483,988, filed Apr. 11, 2017, titled "SKID MOUNTED OIL WELL PRODUCTION PROCESSING SYSTEM," the disclosure of which is incorporated by reference herein in its entirety.

STATEMENT REGARDING FEDERALLY SPONSORED RESEARCH OR DEVELOPMENT

Not applicable.

FIELD OF THE INVENTION

The present invention relates generally to a skid mounted oil production processing system and method. More particularly, but not by way of limitation, embodiments of the present invention provide skid mounted oil production systems that include piping, instrument, electrical, and control components and connections, wherein the skid mounted production systems are capable of expansion or contraction as the requirements of the production well changes without the need to perform welding at the site.

BRIEF SUMMARY

The following presents a simplified summary of the disclosed subject matter in order to provide a basic understanding of some aspects of the subject matter disclosed herein. This summary is not an exhaustive overview of the technology disclosed herein. It is not intended to identify key or critical elements of the invention or to delineate the scope of the invention. Its sole purpose is to present some concepts in a simplified form as a prelude to the more detailed description that is discussed later.

Oil production is the process by which a reservoir fluid is transported to the surface to be separated into oil, gas and water. If necessary, the obtained oil and gas will be treated and conditioned for sale or transport from the field to a petroleum refinery. The so called "upstream operations" consist of the exploration, development and production of crude oil, water and natural gas.

The production process is carried out in a surface installation. This installation includes wells, manifolds, pipelines, production lines, separators and other process equipment, as well as measuring equipment and storage tanks. Over time a well's oil production can decrease by fifty percent (50%), which results in equipment such as separators that were originally installed with the inception of the well, being oversized. However, replacing the equipment with smaller, less expensive in both initial and operating costs would require the production well to be shutdown and the system purged in order to perform the requisite welding and running of the various electrical, piping and pneumatic connections. In some cases the production capabilities of a well may have been underestimated and therefore results in the installed equipment being undersized. Embodiments of the present invention resolve these issues and allow for the contraction or expansion of oil production systems using skid mounted components, without the need for welding onsite.

Additionally, embodiments of the present invention drastically reduce both shop construction time and installation time. For example, construction time of traditional systems can take in excess of eight (8) weeks to complete, whereas construction of systems in accordance with an embodiment of the present invention can be complete on average of fourteen (14) days at a 30-35% reduction of cost and are completely ready for startup with full safety systems. Similarly, installation time of traditional systems oil production systems, can take four (4) weeks or more to complete. But in stark contrast, an entire system in accordance with an embodiment of the present invention, including skids and vessels can be installed and connected in approximately four (4) hours.

In one embodiment, an apparatus, system and method for a portable oil production modular system for processing fluids produced by an oil well, having a first skid section having comprising a first piping manifold for fluid flow having a first piping manifold connection assembly, a first separator for separating a water-oil mixture into separate fluid components, and a first set of spaced apart beams on which the first piping manifold is mounted. This system also includes a second skid section that is separable from the first skid section, comprising a second piping manifold for fluid flow having a second piping manifold connection assembly, and a second set of spaced apart beams on which the second piping manifold is mounted. This system further includes a fork pin connector having guide plates that is coupled at one end to a beam of one skid section. The other end of the fork pin connector includes angled projections on the guide plates having a pin there between. In some embodiments, the system can also include a knife connector coupled to a beam of another skid section; wherein the first skid section is capable of connecting to the second skid section by engagement of the fork and knife connectors, and wherein when the first and second skid sections are connected, the first piping manifold is connectable to the second piping manifold via the interconnection of the first piping manifold connection assembly and the second piping manifold connection assembly, without the need for welding. Further, should the oil production system for the oil well need a smaller or larger separator, a third skid section comprising a third piping manifold for fluid flow having a third piping manifold connection assembly, a second separator for separating a water-oil mixture into separate fluid components, and a third set of spaced apart beams on which the third piping manifold is mounted is capable of replacing the first skid section, by disconnecting the first skid section from the second skid section, and wherein the third skid section is capable of connecting to the second skid section by interconnection of the fork and knife connectors, and wherein when the third and second skid sections are connected, the third piping manifold is connectable to the second piping manifold via the interconnection of the third piping manifold connection assembly and the second piping manifold connection assembly, without the need for welding.

In another embodiment, the connector for securing two sections together, includes a angled pin plate having an angled end at one end and the other end being welded to a beam of the skid, wherein as the skids are pushed together the angled end of the pin plate engages the side of the web of a beam, such as an I-beam.

In another embodiment, the portable oil production modular system also includes the first skid section having a first conduit containing a first set of conductors capable of carrying electrical signals; and the second skid section having a second conduit containing a second set of conductors capable of carrying electrical signals, wherein the first and second sets of conductors are connectable via an interconnection of the first and second conduits.

In yet another aspect of an embodiment of the present invention, the portable oil production modular system further includes the third skid section having a third conduit containing a third set of conductors capable of carrying electrical signals, wherein when the first skid section is replaced by the third skid section, the second and third sets of conductors are connectable via an interconnection of the second and third conduits.

In another aspect of an embodiment of the present invention, the portable oil production modular system further includes a first electrical terminator that is connected to the first set of conductors; a second electrical terminator that is connected to the second set of conductors; and a third electrical terminator that is connected to the third set of conductors, wherein the second electrical terminator is connected to the third electrical terminator.

In another aspect of an embodiment of the present invention, the portable oil production modular system further includes a first electrical terminator that is connected to the first set of conductors; and a second electrical terminator that is connected to the second set of conductors; wherein the first electrical terminator is connected to the second electrical terminator.

In yet another aspect of an embodiment of the present invention, the portable oil production modular system further includes the first skid section having a first pneumatic manifold having a first pneumatic manifold connection assembly; and the second skid section having a second pneumatic manifold having a second pneumatic manifold connection assembly, wherein the first and second pneumatic manifolds are connectable via an interconnection of the first and second pneumatic manifold connection assemblies, without the need of welding.

In yet another aspect of an embodiment of the present invention, the portable oil production modular system further includes the third skid section having a third pneumatic manifold having a third pneumatic manifold connection assembly, wherein when the first skid section is replaced by the third skid section, the second and third pneumatic manifolds are connectable via an interconnection of the second and third pneumatic manifold connection assemblies, without the need of welding.

In another aspect of an embodiment of the present invention, the system includes an integrated sand separator in at least one of, a plurality of, or all of the high pressure separators in the system. In this embodiment, the high pressure separator is connected to the wellhead and includes an internal sand separator system disposed within the high pressure separator. The sand separator system filters out the majority of the sand from the well head fluid stream. The sand separator system includes a sand weir plate and drain system, wherein when the inlet flow from the well head impinges upon an inlet diverter mounted inside the high pressure separator vessel, the sand separates from the fluid and is collected at the base of the sand weir plate. In another aspect of this embodiment, the high pressure separator includes a self-cleaning sand separator system, wherein after the separated sand is collected at the base of the sand weir plate, it is drained from the high pressure separator. In a further aspect of this embodiment, a sand choke valve is used to remove the sand from the separator, eliminating the need to shut down the system to vacuum remove the sand.

In yet another aspect of an embodiment of the present invention, a level measuring device, such as an ultrasonic/sonar level device, a radar level device, an ultrasonic level device, or a capacitance level device measures the level of collected sand and communicates this level to the control or monitoring system. A further aspect of an embodiment can include a control system actuated valve that can be programmed and operated to open in order to drain the sand. Further, the control system can send a signal to open the valve based on when the sand level reaches a desired setpoint.

In a further embodiment of the present invention, an oil and gas production separator for receiving a production stream comprising liquids, gas, and solids, the separator comprising: a pressure vessel having an interior cavity configured to receive a production stream comprising oil, gas, water and solids; an inlet nozzle connected to said vessel and in communication with the interior cavity through which the production stream enters the vessel; a first vertical plate attached near a top surface of an interior wall of the vessel, said first vertical plate extending vertically downward toward a bottom surface of the vessel, wherein the first vertical plate being located near the inlet nozzle; a second vertical plate attached to the bottom surface of the interior wall of the vessel, said second vertical plate extending upward from the bottom surface of the vessel, the second vertical plate being located adjacent to and a distance behind the first vertical plate; a first outlet nozzle connected to said vessel and in communication with the interior cavity for removal of solids from the production stream, the first outlet nozzle extending from a bottom wall of the vessel between the first vertical plate and the second vertical plate; a second outlet nozzle connected to said vessel and in communication with the interior cavity for removal of a first fluid from the production stream, the second outlet nozzle extending from the bottom wall of the vessel, the second outlet nozzle being located behind the second vertical plate; a third vertical plate attached to the bottom surface of the interior wall of the vessel, said third vertical plate extending upward from the bottom surface of the vessel, the third vertical plate being located behind the second outlet nozzle, wherein a top of the third vertical plate extends above a top of the second vertical plate; a third outlet nozzle connected to said vessel and in communication with the interior cavity, said third outlet nozzle extending from the bottom wall of the vessel for removing a second fluid from the production stream, the third outlet nozzle being located behind the third vertical plate; and a fourth outlet nozzle connected to said vessel and in communication with the interior cavity for removal of a gas, said fourth outlet nozzle extending from an upper wall of the vessel.

In a further embodiment of the present invention, an alignment module system, comprising: a first module, comprising: an alignment beam member having a first end and a second end, a first fork connector having a centerline along its longitudinal axis, said first fork connector in engagement with and coupled to the first end of said alignment beam; and a second fork connector having a centerline along its longitudinal axis, said second fork connector in engagement with and coupled to the second end of said alignment beam; a second module, comprising: an alignment beam member having a first end and a second end, a first pin connector having a centerline along its longitudinal axis, said first fork connector in engagement with and coupled to the first end of said alignment beam; and a second pin connector having a centerline along its longitudinal axis, said second pin connector in engagement with and coupled to the second end of said alignment beam; wherein, said first module may be secured to the second module by engaging the first pin connector with the first fork connector and engaging the second pin connector with the second fork connector.

In another embodiment of the present invention, a stacking system for shipment of multiple pipe racks and other equipment skids on a single trailer is provided. In this embodiment, stacking posts are bolted to a first pipe rack steel beam at various points along the length of the first pipe rack, and at the other end of the stacking posts, the stacking posts are bolted to a second pipe rack steel beam at various points along the length of the second pipe rack, wherein the second pipe rack is positioned above the first pipe rack. In this embodiment, a single trailer can transport both the first and second pipe racks in one trip. Additionally, third, fourth, and any number of additional pipe racks can me mounted on the trailer atop the other pipe racks using additional stacking posts. Not only can pipe racks be mounted for transport and transported on a trailer in this manner, equipment mounted on beams can also be stacked and transported in this manner.

In a further aspect of an embodiment, the system includes a control system, such as a DCS, PLC, SCADA, or wireless control system (e.g., wireless instrumentation and control devices that communicate over a wireless network), or a combination of these types of control systems that are operatively in communication with the modular production system's instrumentation, actuators and valves. The control system can be used to monitor and control the operation of the production system and operational data that can be used to generate and predict production systems operational setpoints, maintenance needs, measurements, and values, including service to the equipment, such as the need to drain sand from the integrated sand separator. For example, and as discussed further below, there is data collection via a computer communication network of production system operating parameters and determined setpoint data for a production system, including the separator systems, wherein using data analytics, artificial intelligence, machine learning and/or neural network methodologies to: predict the subject, a related, or an unrelated production system's performance and/or operational setpoints; generate benchmarking metrics for production systems' operation and maintenance; and/or generate setpoints and anticipated measurement and production system operational values.

The modular production system in accordance with an embodiment of the present invention is a production system that can adapt to many and changing circumstances. It's "plug and Play" design provides the ability to easily change out the size of equipment, separator, outlet lines, controls, etc., from early life well construction to late well life production. In a further aspect, when any piece of equipment is pulled out of service, the piping footprint remains the same and any new piece of equipment can be pushed into play with minimal downtime and no additional manufacturing or changes to equipment or interconnecting pipe is required.

BRIEF DESCRIPTION OF THE DRAWING

For a more complete understanding of this disclosure, reference is now made to the following brief description, taken in connection with the accompanying drawings and detailed description, wherein like reference numerals represent like parts.

FIG. 1 depicts a crude oil and/or natural gas production system for multiple wells in accordance with an embodiment of the present invention.

FIG. 2 depicts a top view of the system shown in FIG. 1.

FIG. 3 depicts a portion of the system disclosed in FIGS. 1 and 2.

FIG. 4 depicts a portion of the system disclosed in FIGS. 1, 2 and 3.

FIG. 5 depicts a crude oil and/or natural gas production system for multiple wells in accordance with an embodiment of the present invention.

FIG. 6A depicts a portion of the system in accordance with an embodiment of the present invention.

FIG. 17 depicts a stacking spacer in accordance with an embodiment of the present invention.

Figure 6B:
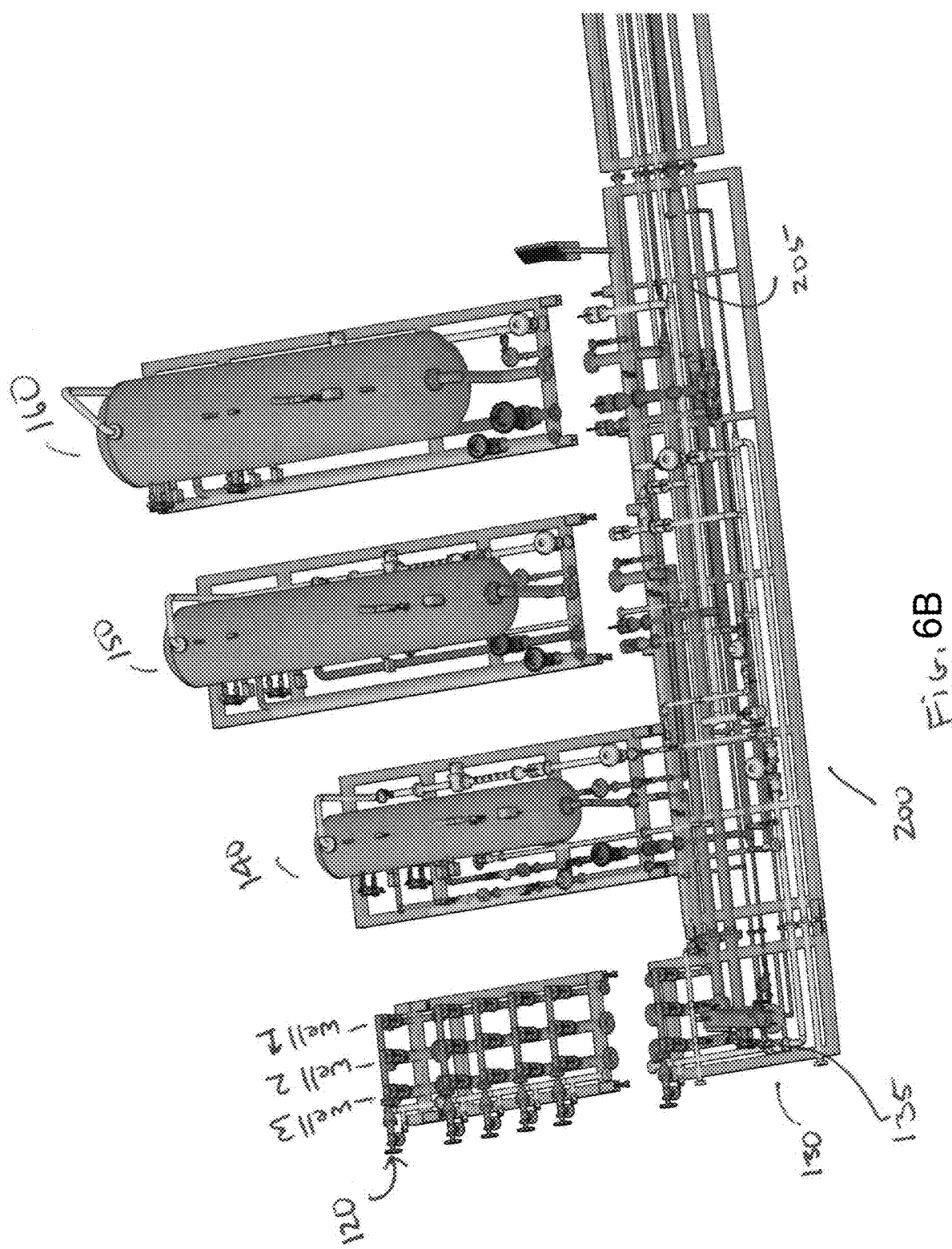
FIG. 6B depicts a portion of the system disclosed in FIG. 5 in accordance with an embodiment of the present invention.

While certain embodiments will be described in connection with the preferred illustrative embodiments shown herein, it will be understood that it is not intended to limit the invention to those embodiments. On the contrary, it is intended to cover all alternatives, modifications, and equivalents, as may be included within the spirit and scope of the invention as defined by claims. In the drawing figures, which are not to scale, the same reference numerals are used throughout the description and in the drawing figures for components and elements having the same structure, purpose or function.

DETAILED DESCRIPTION

Turning now to the detailed description of the preferred arrangement or arrangements of various embodiments of the present invention, it should be understood that, although an illustrative implementation of one or more embodiments are provided below, the inventive features and concepts may be manifested in other arrangements and that the scope of the invention is not limited to the embodiments described or illustrated. The various specific embodiments may be implemented using any number of techniques known by persons of ordinary skill in the art. The disclosure should in no way be limited to the illustrative embodiments, drawings, and/or techniques illustrated below, including the exemplary designs and implementations illustrated and described herein. The scope of the invention is intended only to be limited by the scope of the claims that follow. Furthermore, the disclosure may be modified within the scope of the appended claims along with their full scope of equivalents.

While the making and using of various embodiments of the present disclosure are discussed in detail below, it should be appreciated that the present disclosure provides many applicable inventive concepts that can be embodied in a wide variety of specific contexts. The specific embodiments discussed herein are merely illustrative of specific ways to make and use the disclosure and do not limit the scope of the disclosure.

The present disclosure will now be described more fully hereinafter with reference to the accompanying figures and drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

FIG. 1 depicts a crude oil and/or natural gas production system comprising a cluster of four (4) wells (not shown). As shown in FIG. 1, a production system according to an embodiment of the invention in which a multiphase fluid mixture comprising crude oil, water, natural gas and/or other fluids is produced by a cluster of four (4) wells (not shown) and transported via multiphase fluid transport pipelines to individual well high pressure bulk separators 10, 20, 30 and 40, and low pressure separator 50. As shown in FIG. 1, the equipment, including the piping, instrumentation, and pipe rack is mounted on several skid sections. The system also includes a fuel gas scrubber 60, tank battery 70 having ten (10) storage tanks 70a-70k, which store water, oil and other fluids and materials that are produced by the wells. FIG. 1 also shows the system including vapor recovery tower 80, flare knock-out drum 90 and flare stack 100.

FIG. 2 depicts a top view of the production system shown in FIG. 1. As shown in more detail in FIG. 2, the system includes a pipe rack 110 that is made of multiple sections 110a, 110b, 110c, 110d, 110e, 110f and 110g of pipe, which are also mounted on skids. FIG. 3 shows an expanded view of a portion of the production system shown in FIGS. 1 and 2, wherein high pressure separators 10, 20, 30, 40, low pressure separator 50, fuel gas scrubber 60 and pipe rack sections 110a, 110b, 110c, 110d, and 110e are shown. As also shown in FIG. 3, various instrumentation devices, including flow, level, pressure control and control valves are shown for the production equipment systems. FIG. 4 is a subset of the production system depicted in FIGS. 1-3, wherein high pressure separator 40, fuel gas scrubber 60, and pipe rack sections 110d, 110e are shown. As shown in FIG. 4, although pipe rack section 110e is shown, low pressure separator 50 is not shown and only the piping connections are shown.

As discussed above, over time a well's oil production can decrease by fifty percent (50%), which results in equipment, such as separators that were originally installed with the inception of the well, now being oversized. However, replacing the equipment with smaller, less expensive in both initial and operating costs would require the production well to be shutdown and the system purged in order to perform the requisite welding and running of the various electrical, piping and pneumatic connections. In some cases the production capabilities of a well may have been underestimated and therefore results in the installed equipment being undersized. Embodiments of the present invention resolve these issues and allow for the contraction or expansion of oil production systems using skid mounted components, without the need for welding onsite.

FIGS. 5, 6A and 6B depict an embodiment of the invention for a three (3) well (well 1, well 2, and well 3) production system having well manifold 120 and high pressure separators 140, 150 and 160. No low pressure separator is depicted in FIG. 5. FIGS. 5, 6A and 6B also depict skid 130, which includes fuel gas scrubber 135, and pipe rack 200, which pipe rack 200 is made of multiple pipe rack skid sections. FIG. 5 also includes tank battery 170, vapor recovery tower 175, flare knock-out drum 180 and flare stack 190. FIGS. 6A and 6B also show heat exchanger 205 within pipe rack 200.

Figure 7:
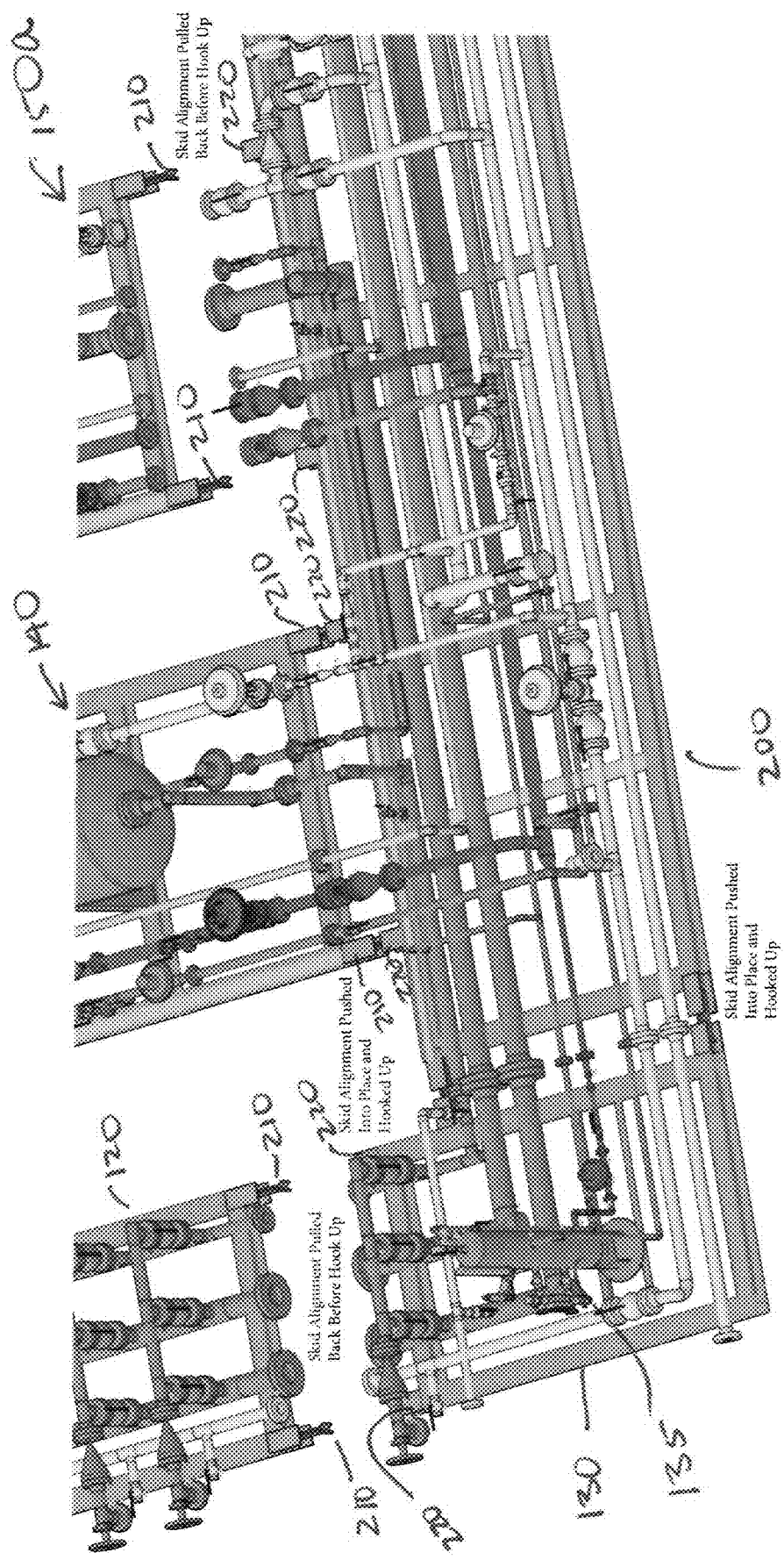
FIG. 7 depicts a portion of the system disclosed in FIGS. 5 and 6B and the piping and alignment pin connections in accordance with a further embodiment of the invention.

In an embodiment of the invention depicted in FIGS. 5-7, and as can be more readily seen in FIG. 6B, high pressure separator 160 is larger than high pressure separator 150, and high pressure separator 150 is larger than high pressure separator 140. As shown in FIG. 6A, only well 1 and well 2 have separators 140 and 160, wherein separator 140 is connected to well 1 and separator 160 is shown disconnected from well 2. Additionally, in accordance with an embodiment of the invention, the oil production modular system includes blinded piping and skid systems that can be used as additional wells are developed. For example, manifold 120 includes piping for well 1 and well 2, as well as additional piping 121 that can be used to commission a new well, e.g., well 3. Similarly, pipe rack 200 includes piping skid section 206 that can be used as additional wells are developed. Referring to FIG. 6A, during normal operation of this two well production system, well 1 provides production feed to separator 140, and well 2 provides production feed to larger separator 160.

In a further aspect of an embodiment, overtime, the production of well 2 begins to decrease, such that the large separator 160, that likely had been used since well 2's commissioning is now oversized. The operator can remove separator 160 from being associated with well 2, and a smaller separator 150 can replace larger separator 160 as shown in FIG. 6B. As also shown in FIG. 6B, rather than purchase a new separator for new well 3, well 3 is configured to provide production feed to larger separator 160, which had previously been used for well 2. In normal operation, well 1 provides production feed to separator 140, well 2 provides production feed to separator 150, and well 3 provides production feed to separator 160 as shown in FIGS. 5, 6B and 7.

As shown in FIGS. 5, 6A and 7, because the production capacity in well 2 had been diminished, embodiments of the present invention allowed the larger, more expensive separator 160 to be used with new well 3, and a smaller less expensive separator 150 to be used with existing well 2, without the need for welding. The replacement is quick and does not require that all of the production wells to be stopped and the systems purged due to the need for welding piping components.

Figure 10:
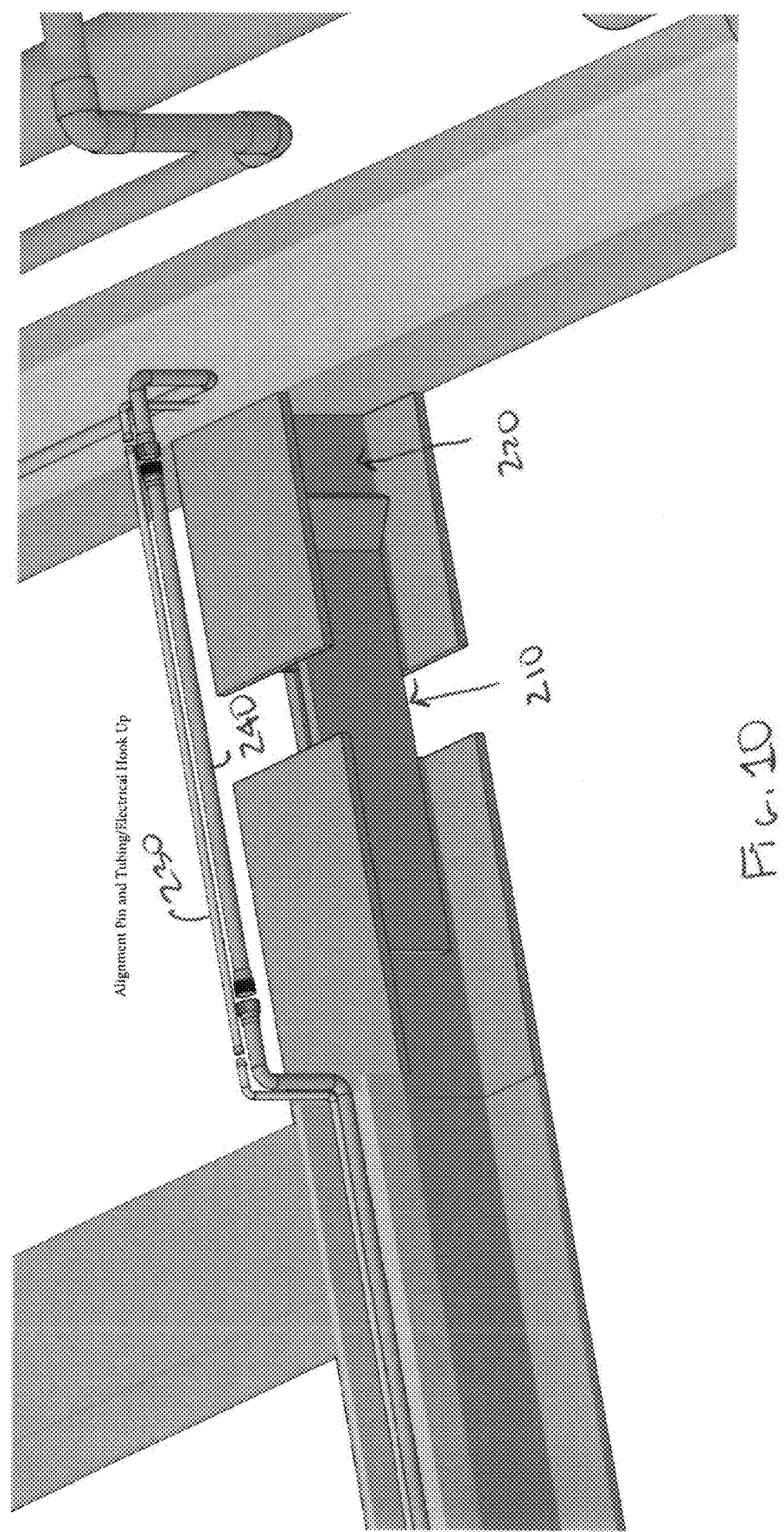
FIG. 10 depicts an expanded view of the rigid beam alignment connections and electrical conductor and pneumatic tubing connections in accordance with an embodiment of the present invention.

An example of the removal and replacement of modular skid systems while the oil production processing system is in operation is now described. Referring to FIGS. 5, 6A, 6B and 12, open sand leg of separator 160 by opening block valves 305 and adjustable choke valve 306 causing sand to drain into sand leg discharge pipe 307. Block in well 2 at the well manifold 120. Drain separator 160 of oil and water fluids. In separator 160, close gas outlet, oil outlet, and water outlet by for example using block valves in pipe rack 200. Depressurize any residual gas pressure in separator 160. Remove flange nuts at separator 160 gas inlet. Remove flange nuts from separator 160 process gas outlet pipe flange at the pipe rack 200 junction. Remove flange nuts from separator 160 process oil outlet pipe flange at the pipe rack 200 junction. Remove flange nuts from separator 160 process water outlet pipe flange at the pipe rack 200 junction. Disconnect tubing connections 230 (see FIG. 10) of pneumatic manifold at separator 160 pipe rack 200 junction. Disconnect electrical connections 240 (see FIG. 10) at junction between separator skid 160 and pipe rack 200. Remove separator 160 from pipe rack 200 by pulling separator 160 away from pipe rack 200 to disengage knife 220 and fork 210. Using a crane or other suitable mechanism, lift separator 160 skid with, e.g., lifting eyes, and reposition separator 160 out of the way.

To replace the larger separator 160 with smaller separator 150, after larger separator 160 has been removed, place smaller separator 150 in close proximity to pipe rack 200 skid. Using the alignment guide plates of fork 210, pin 215, and knife 220, push separator 150 into position at pipe rack 200 skid until knife 220 and fork 210 alignment plates and pin 215 engagement occurs. Connect tubing connections 230 (see FIG. 10) of pneumatic manifold at separator 150 pipe rack 200 junction. Connect electrical connections 240 (see FIG. 10) at junction between separator skid 150 and pipe rack 200. Install ⅛" gaskets between flange pairs for well head inlet, and gas, oil, and water outlets. Install studs and nuts, torque to specification. Follow pressurization and start-up procedure per facility. As shown, replacing oversized and larger separator 160 with the smaller separator 150 did not require any welding, that would require the entire production well site to be shut down and the system purged in order to perform the requisite welding and running of the various electrical, piping and pneumatic connections.

In another embodiment of the present invention, additional parts are or the entire production system is constructed on skid section systems as disclosed herein, wherein component pieces of the system, including pipe racks 110a-110g, 200, vapor recovery tower 175, flare knock-out drum 180, flare stack 190, fuel gas scrubber 60, and a multi-well separator are constructed and designed to be replaced in a modular form. The modular construction and replacement of additional equipment in accordance with an embodiment of an invention include, high-pressure test separators, low-pressure test separators, line heaters, heater treaters, gas dehydration units, gas powered units, combustors, slug catchers, bulk separators, sand separators, methanol injection skids, pig launchers and receivers, safety systems, instrumentation and electrical equipment skids, SCADA systems, flares, and other equipment that may be used at a well head production system.

Cold Weather Packaging Modular Production System

Figure 16:
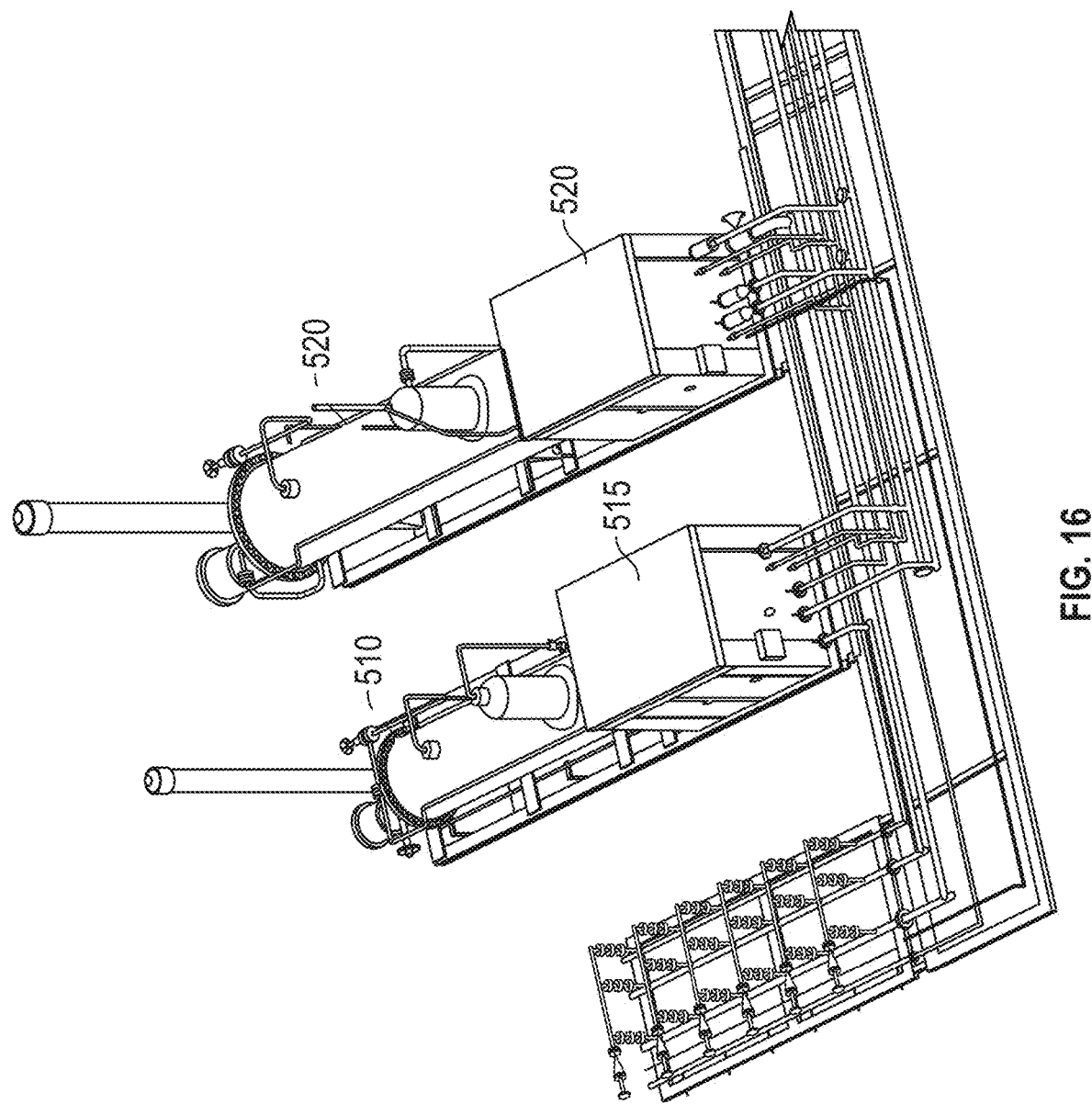
FIG. 16 depicts a Cold Weather Packaging Modular Production System in accordance with an embodiment of the present invention.

FIG. 16 illustrates a further aspect of the modular production system embodiment, wherein a cold weather packaging modular production system is provided. In these systems, the piping is heat traced and insulated in a complete package prior to delivery, including the pipe rack piping sections and equipment skid piping. The heat trace on the piping can include connectors or terminators for connecting the ends of the heat tracing across the pipe rack and equipment skids during installation. The equipment, such as separator skids 510, 520 can also be outfitted for cold weather operation, including insulated vessels and heated steel box frames 515, 520 that cover the instrumentation and controls to shield equipment from cold winds to avoid freezing of condensed liquids in the tubing control lines and control valves. Further, the separator can be a heated type that includes a fire-tube to promote gas-liquid separation in cold environments.

Knife and Fork Alignment Pin

As more fully depicted in FIGS. 6A, and 6B through 11, the skid systems include knife 220 and fork 210 pin connectors connected to the rigid beam structures that are used to align and connect the skids. For example, the skid systems depicted in the figures can be mounted on steel I-beams. Referring to FIGS. 8-10, and 14-15, the knife 220 and fork 210 pin connectors are alignment guide plates with a self-setting elevation pin 215 slot. Each fork 210 includes two guide plates that are welded at one end to the beam web. The other end of the fork 210 guide plates include angled projection portions. The angled projections of fork 210 help guide the skids into alignment as they are pushed together.

Figure 14:
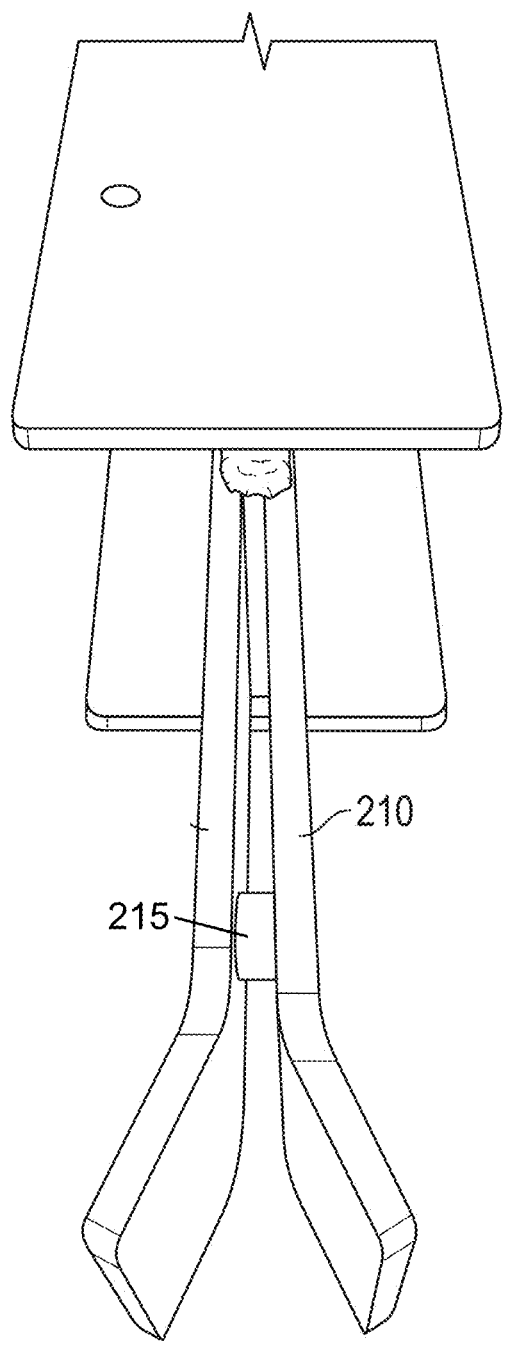
FIG. 14 depicts a fork pin alignment connector in accordance with an embodiment of the present invention.
Figure 14A:
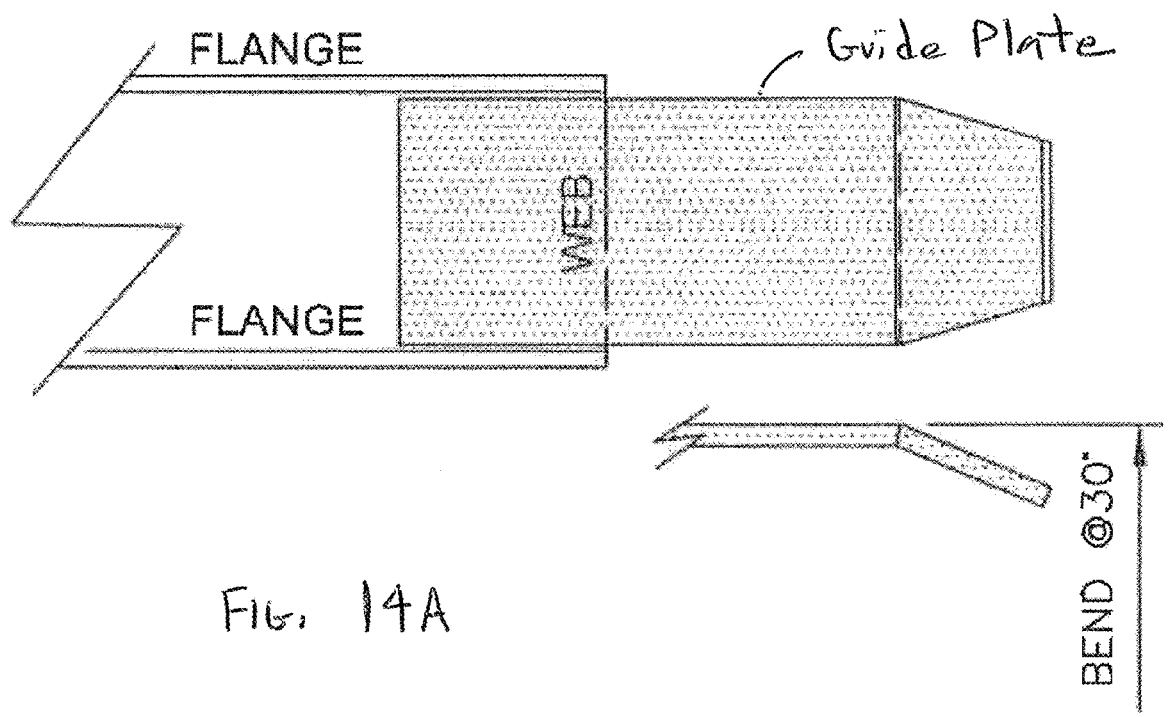
FIG. 14A depicts a side sectional view of a guide plate of the fork depicted in FIG. 14 in accordance with an embodiment of the present invention.
Figure 15:
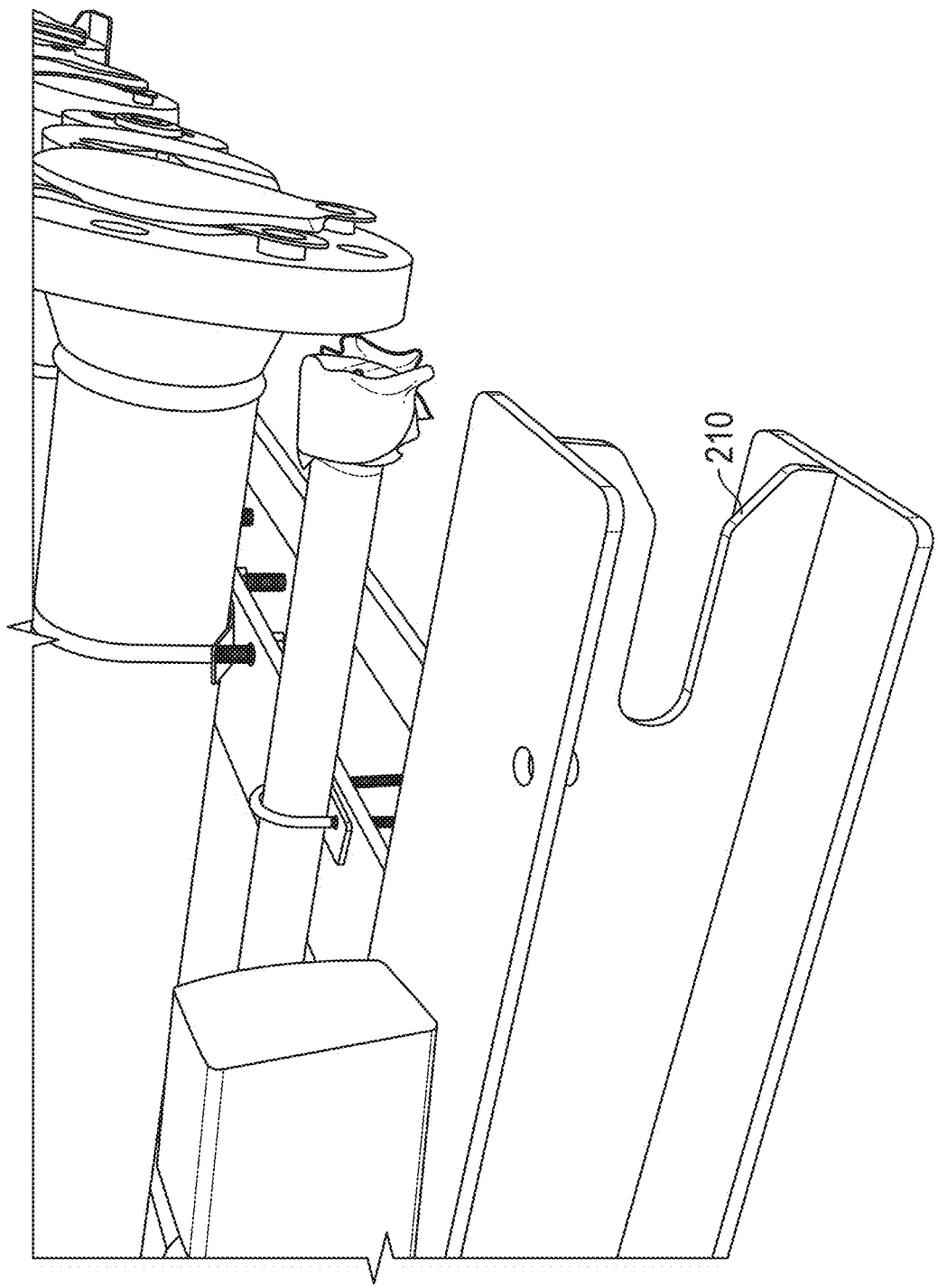
FIG. 15 depicts a knife alignment connector in accordance with an embodiment of the present invention.

A side sectional view of one guide plate of fork 210 is shown in FIG. 14A. As shown in FIG. 14A, the guide plate is welded at one end to beam web, and the other end includes an outwardly angled portion. As shown in FIG. 14, the fork 210 includes pin 215 that can be a small length of round stock bar that can have a length slightly greater than the skid beam web thickness. The pin 215 is welded between the fork 210 two guide plates to keep the free end of the fork 210 guide plates separated. Pin 215 serves as the self-leveling pin as the fork 210 engages the knife 220 while riding in the pin slot. As shown in FIG. 15, the knife 220 slot can be an elongated rounded cutout that is engaged with the fork 210.

Figure 21A:
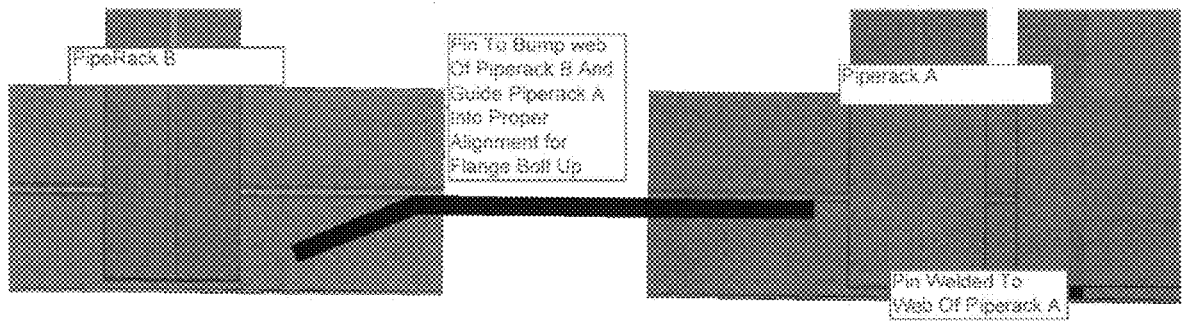
FIG. 21A depicts a guide projection in accordance with an embodiment of the present invention.
Figure 21B:
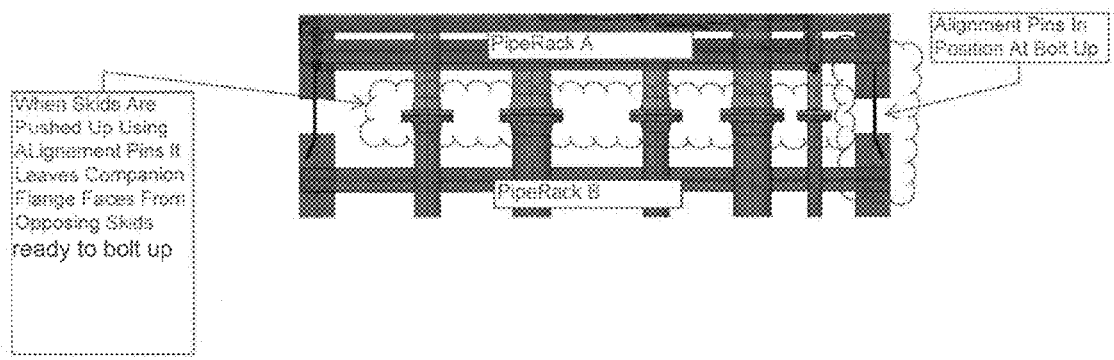
FIG. 21B depicts two pipe rack skid sections secured to each other via the guide projection.
Figure 21C:
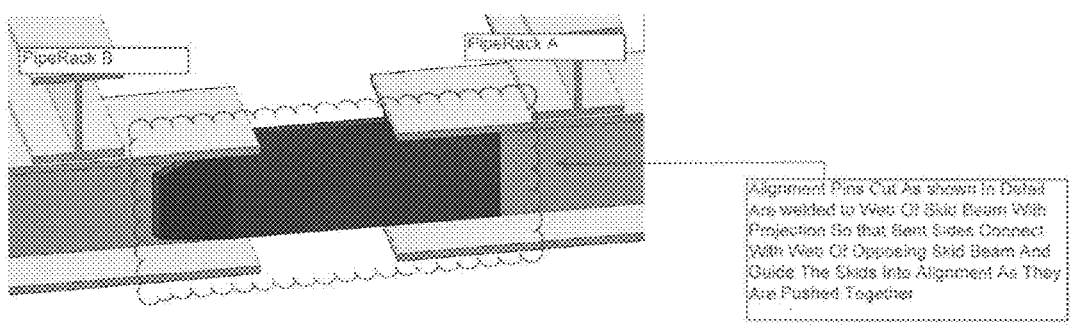
FIG. 21C depicts two pipe rack skid sections secured to each other via the guide projection.

Additionally, other designs of the fork connector can include the guide plates being welded to a beam web without the intervening pin spacer that is welded to both side plates. Here the two skid sections are secured together by the open space between the guide plates engaging the web of the opposing skid section beam. Additionally, an embodiment of the invention includes a single guide plate, such as that shown in FIG. 14A. In this embodiment, as more fully shown in FIGS. 21A, 21B, and 21C, the guide projection 221 is a single plate that is welded to the web of the beam, and includes an outwardly angled end, so that the angled side connects with the web of the opposing beam and guides the skids into alignment as they are pushed together. As the skid sections are pushed together, the guide projection 221 bumps the web of the opposing skid section into proper alignment. As shown in FIGS. 21B and 21C, when the skids are pushed together using the alignment guide 221, it leaves companion flange faces from opposing skids ready to bolt up with minimal final adjustment of pipe headers and ready for a gasket insert.

Figure 11:
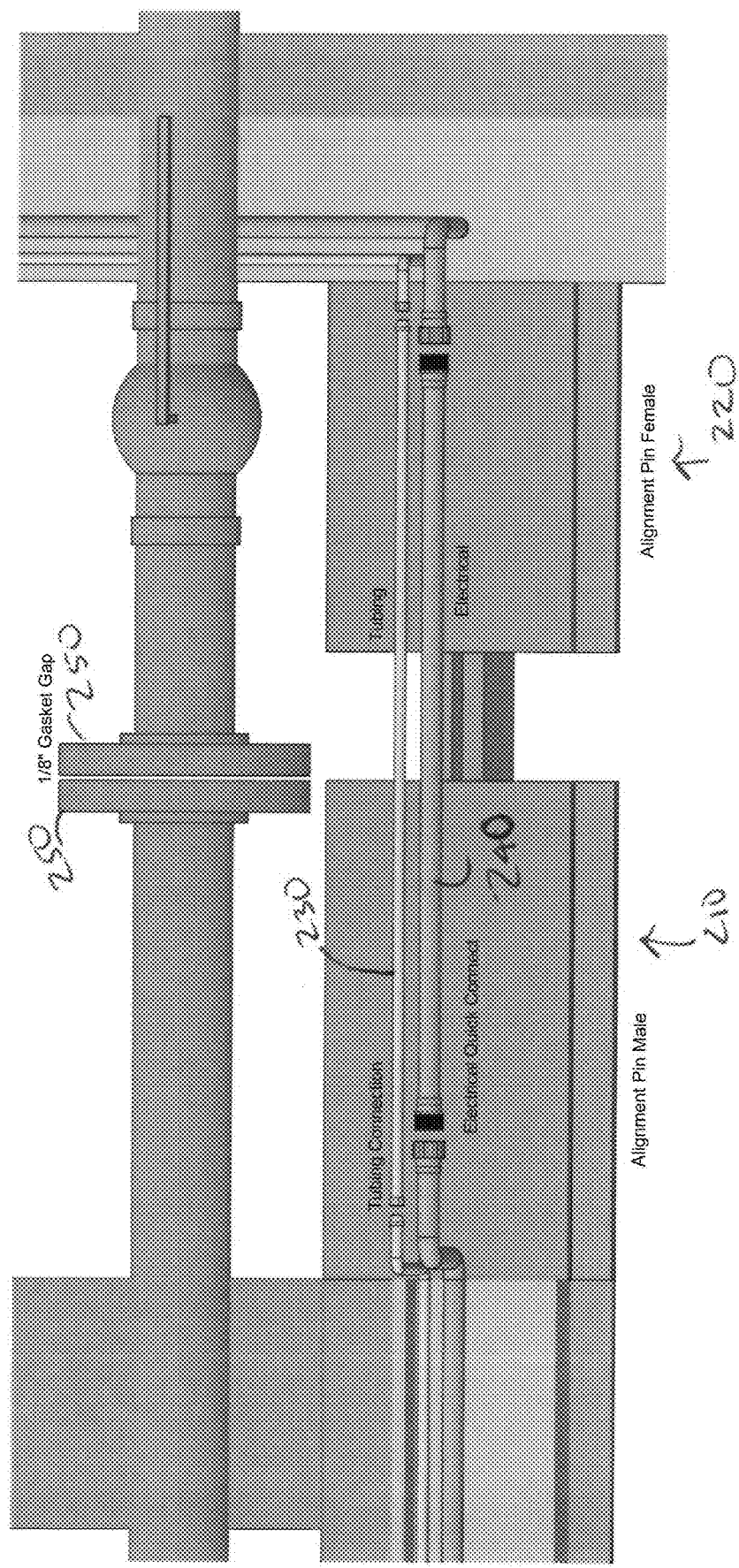
FIG. 11 depicts an expanded view of the piping flanged connections, rigid beam alignment connections and electrical conductor and pneumatic tubing connections in accordance with an embodiment of the present invention.

As shown in FIG. 11, an embodiment of the present invention is designed such that as the skids are pushed together and aligned using the alignment knives 220, forks 210 and pins 215, the interconnecting flanges 250 are pushed up leaving a ⅛ inch gap in order to slide in the necessary gasket. In a further embodiment of the present invention as shown in FIG. 11, the system the skid systems include conductors carrying electrical signals for power, signal, measurement or control in a quick connect type system that are connectable to conductors in other skid systems of the production system by the connection of conductor carrying conduits or emt tubing 240 within the systems, or terminating connectors on the skid systems, which removes the need to run wire and conduit during the installation at the production well site. In a further aspect, cable trays are provided on the system to install "pre-run" electrical cable that is combined with skid-edge mounted junction boxes populated with terminal blocks.

Figure 8:
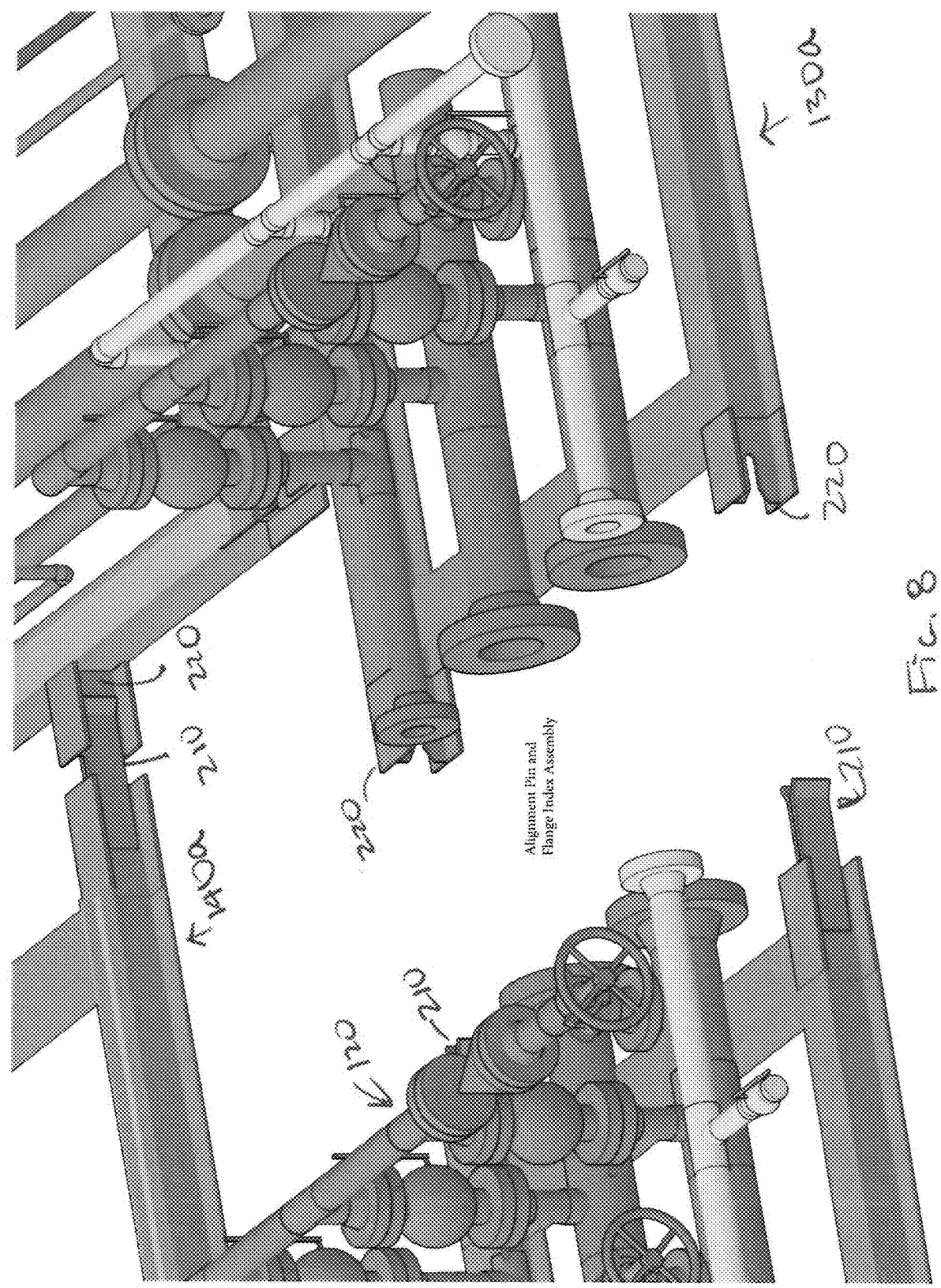
FIG. 8 depicts a portion of the system disclosed in FIGS. 5, 6 and 7 and the piping and alignment pin connections.
Figure 9:
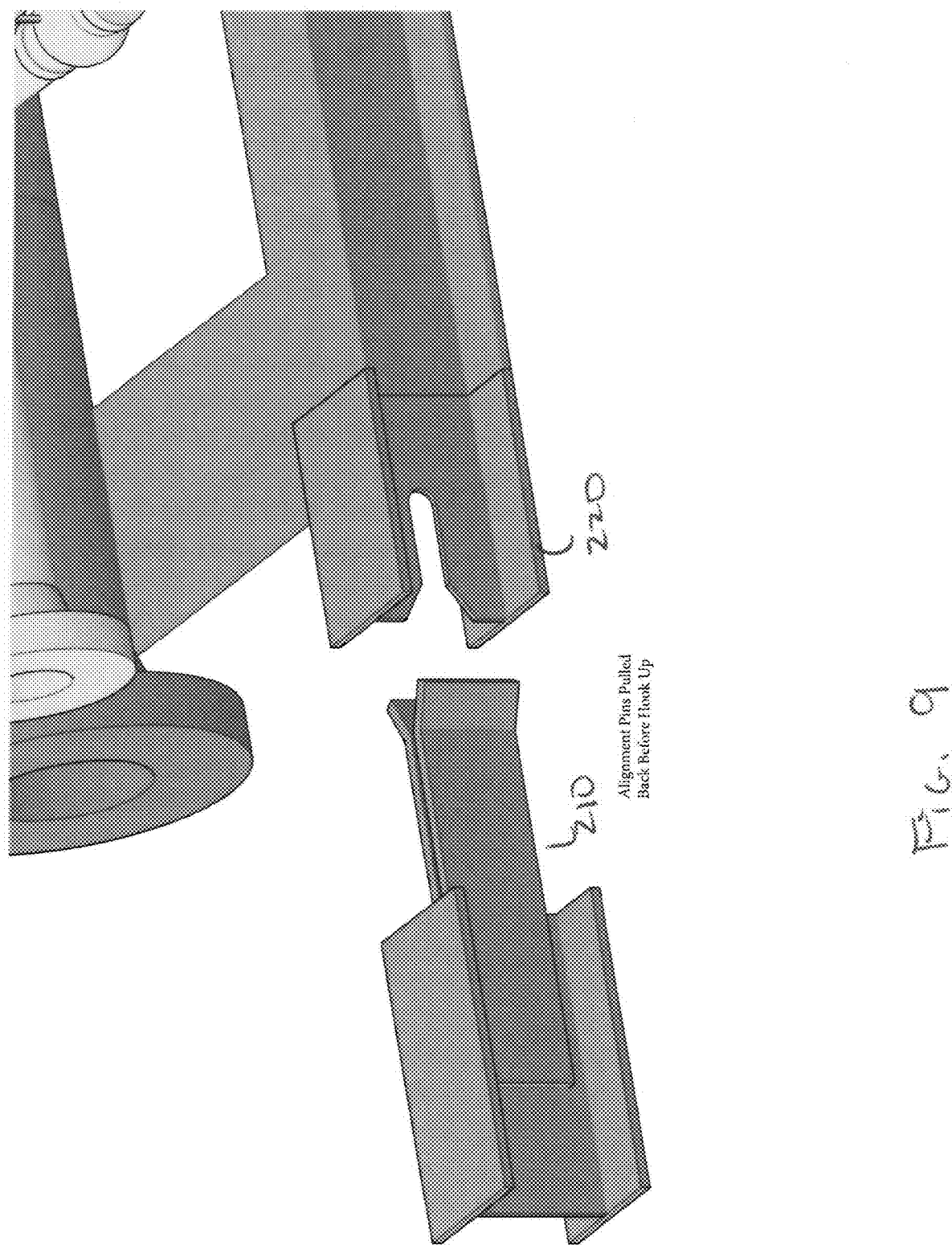
FIG. 9 depicts an expanded view of the rigid beam alignment connections in accordance with an embodiment of the present invention.

In a further embodiment, as shown in FIG. 11, the skid systems also include tubing 230 jumpers for pneumatic connections between the skid systems, which removes the need to run tubing during the installation of a skid system at the production well site. As shown in FIG. 7, skid 150a represents a portion of the skid that high pressure separator 150 as seen in FIG. 6A is mounted on. Referring back to FIG. 7, skid 140a similarly shows a portion of the skid base that high pressure separator 140 is mounted on, and skid portion 130a represents a portion of skid 130 wherein fuel gas scrubber 135 is mounted. As is further illustrated well manifold 120 is shown pulled back before hook up with the mating flanges on pipe rack 200 and hook up of the knife 220 and fork 210, such that when the knife 220 and fork 210 (also depicted in FIG. 9) are connected as similarly depicted between skid portion 130 the flanges on well manifold 120 are mated to the flanges on pipe rack 200 for bolting the flanges one to the other. Still a further aspect of an embodiment of the present invention can include the use of testing components such as testing separators for use with single or multiple wells. FIG. 8 is an enlarged view of FIGS. 5-7 showing skid portion 130 and the piping and alignment pin connections.

Integrated Separator System

Figure 12A:
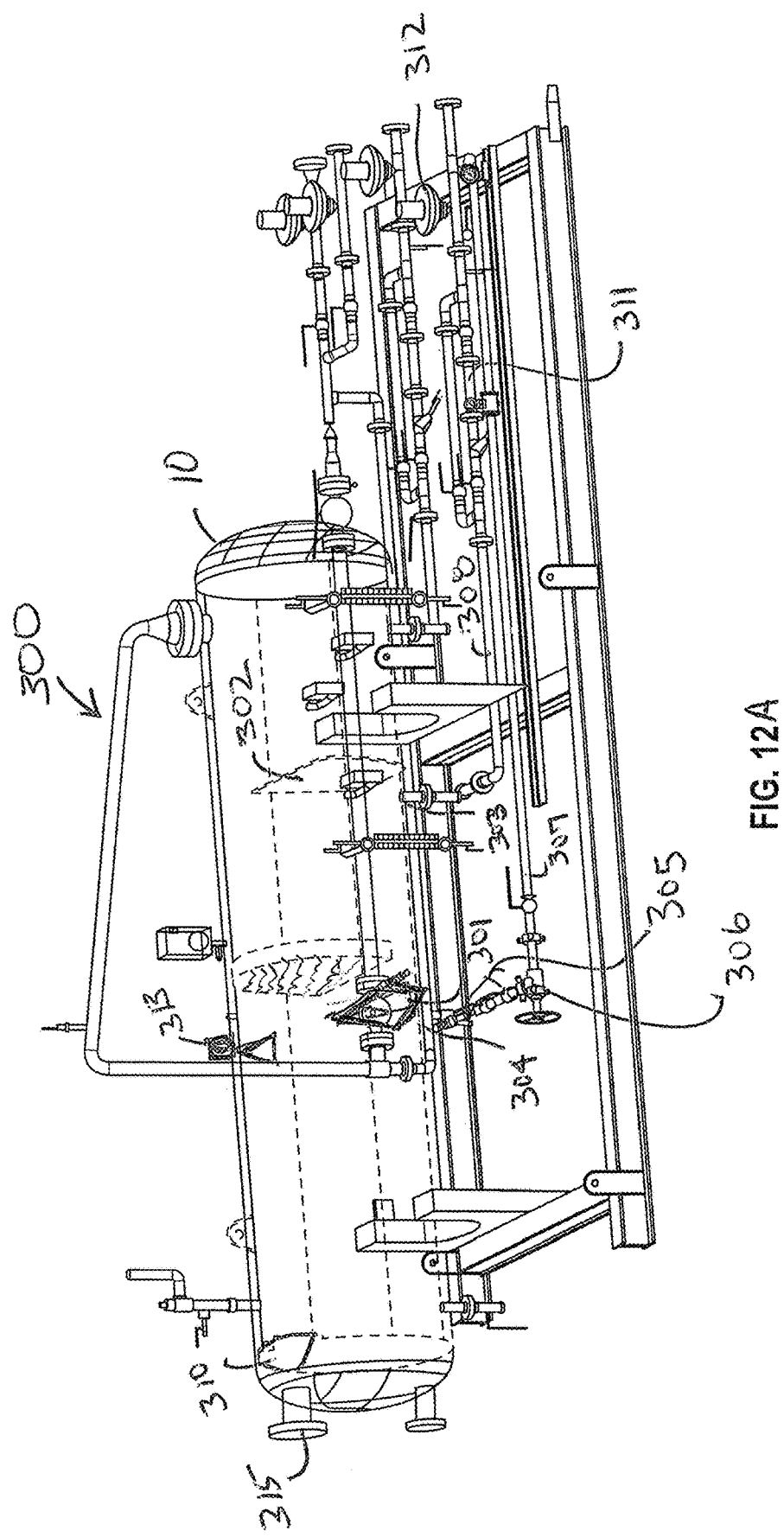
FIG. 12A depicts an integrated sand separator in accordance with an embodiment of the present invention.
Figure 12B:
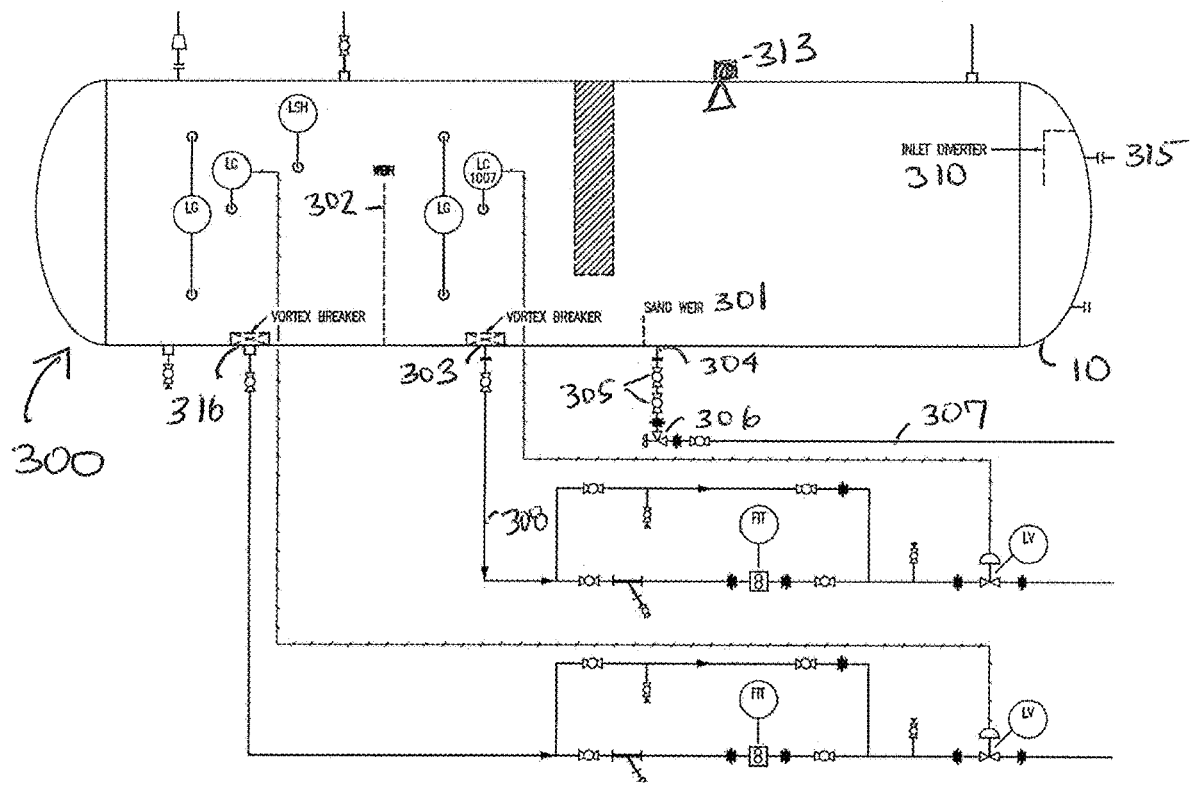
FIG. 12B depicts an integrated sand separator schematic in accordance with an embodiment of the present invention.
Figure 13:
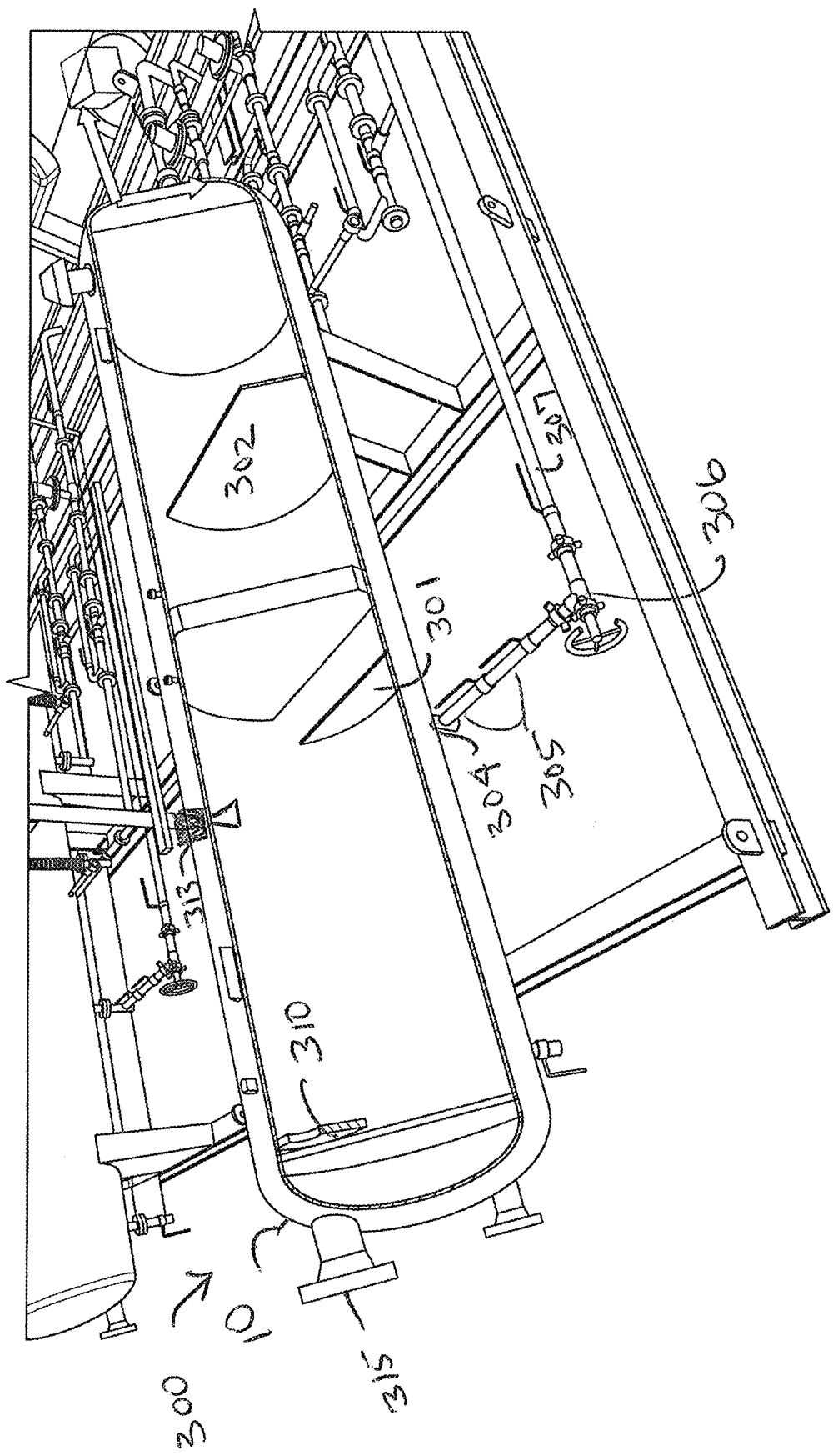
FIG. 13 depicts an integrated sand separator in accordance with an embodiment of the present invention.

FIGS. 12A, 12B, and 13 illustrate an aspect of an embodiment, depicting an integrated sand separator system 300 in one or more of the high pressure separators 10, 20, 30, 40, 140, 150 and 160. In this embodiment, the high pressure separator 10 is connected to the wellhead and includes an internal sand separator system 300 disposed within the high pressure separator 10. The sand separator system 300 filters out the majority of the sand from the well head fluid stream. The sand separator system 300 includes a sand weir plate 301 that is located before an oil weir 302. The sand weir plate 301 is lower that the oil weir 302 in order to collect the sand and keep it from reaching the water out nozzle 303. During operation, sand enters the high pressure separator 10 with the incoming well head fluid inlet 315 and impinges upon an inlet diverter 310 mounted inside the separator vessel 10. When the sand granules impact the inlet diverter 310, a change in momentum of the sand granules is created; causing the sand granules to separate from the fluid and fall to the bottom of the high pressure separator 10 where they are collected at the base of the sand weir plate 301.

Sand system 300 can further include a drain system that includes sand out nozzle 304, double block valves 305, adjustable choke valve 306, and sand leg discharge pipe 307. As shown in FIGS. 12 and 13, the sand leg discharge pipe 307 is routed around the water drain piping 308. The sand leg discharge pipe 307 ties back into the water out header downstream of instruments (for example a vortex flow meter that can be inserted in spool 311) and liquid control valve 312 to avoid the sand's interference with or damaging the instrumentation. The sand system 300 can also include a self-cleaning feature, wherein after the separated sand granules are collected at the base of the sand weir plate 301, the sand is drained from the high pressure separator 10 using a sand choke valve 306, eliminating the need to shut down the system to vacuum remove the sand.

In yet another aspect of an embodiment of the present invention, a level measuring device 313, such as an ultrasonic/sonar level device, a radar level device, an ultrasonic level device, or a capacitance level device measures the level of collected sand and communicates this level to the control or monitoring system (not shown). A further aspect of an embodiment can include choke valve 306 having an actuator or a separate actuator controlled control valve, wherein the control system actuates choke valve 306 or control valve to drain the sand from the high pressure separator 10. The control system can also be programmed to send a signal to open the actuated choke valve 306 or control valve based on when the sand level, as measured by level device 313, reaches a desired setpoint.

Stacking Posts

Figure 18:
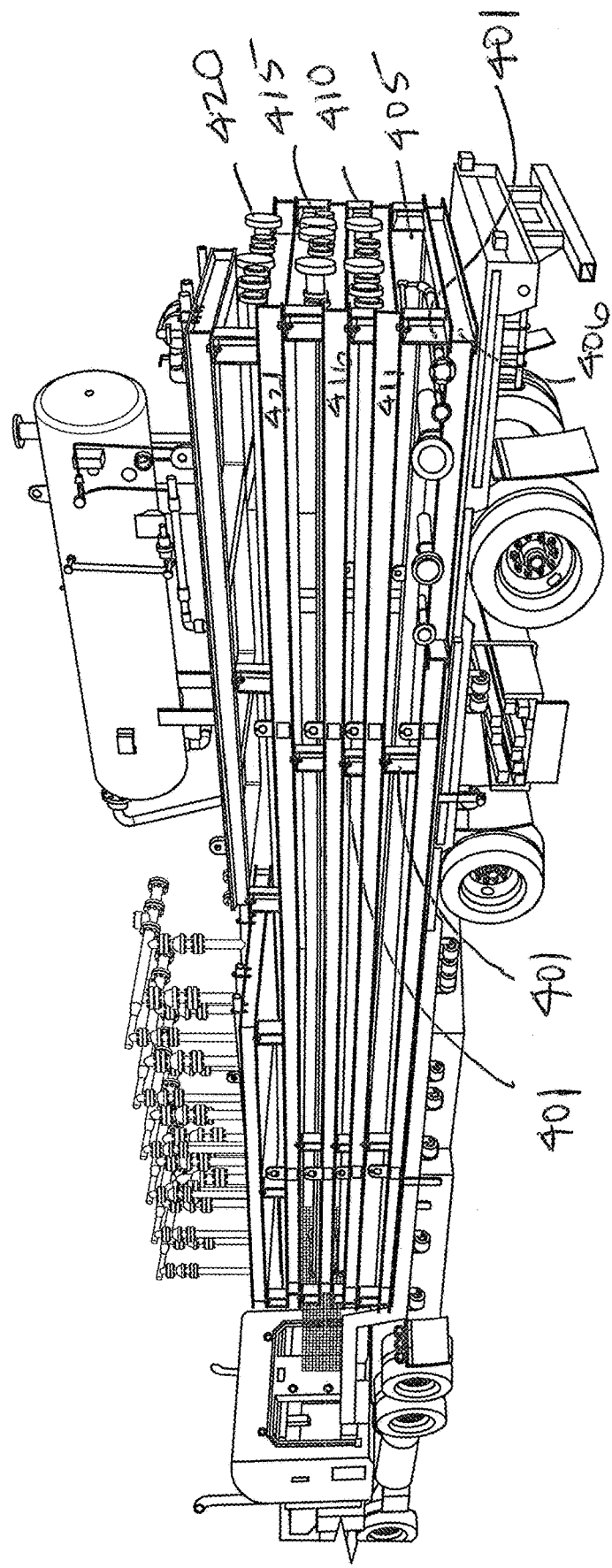
FIG. 18 depicts a stacking system in accordance with an embodiment of the present invention.
Figure 19:
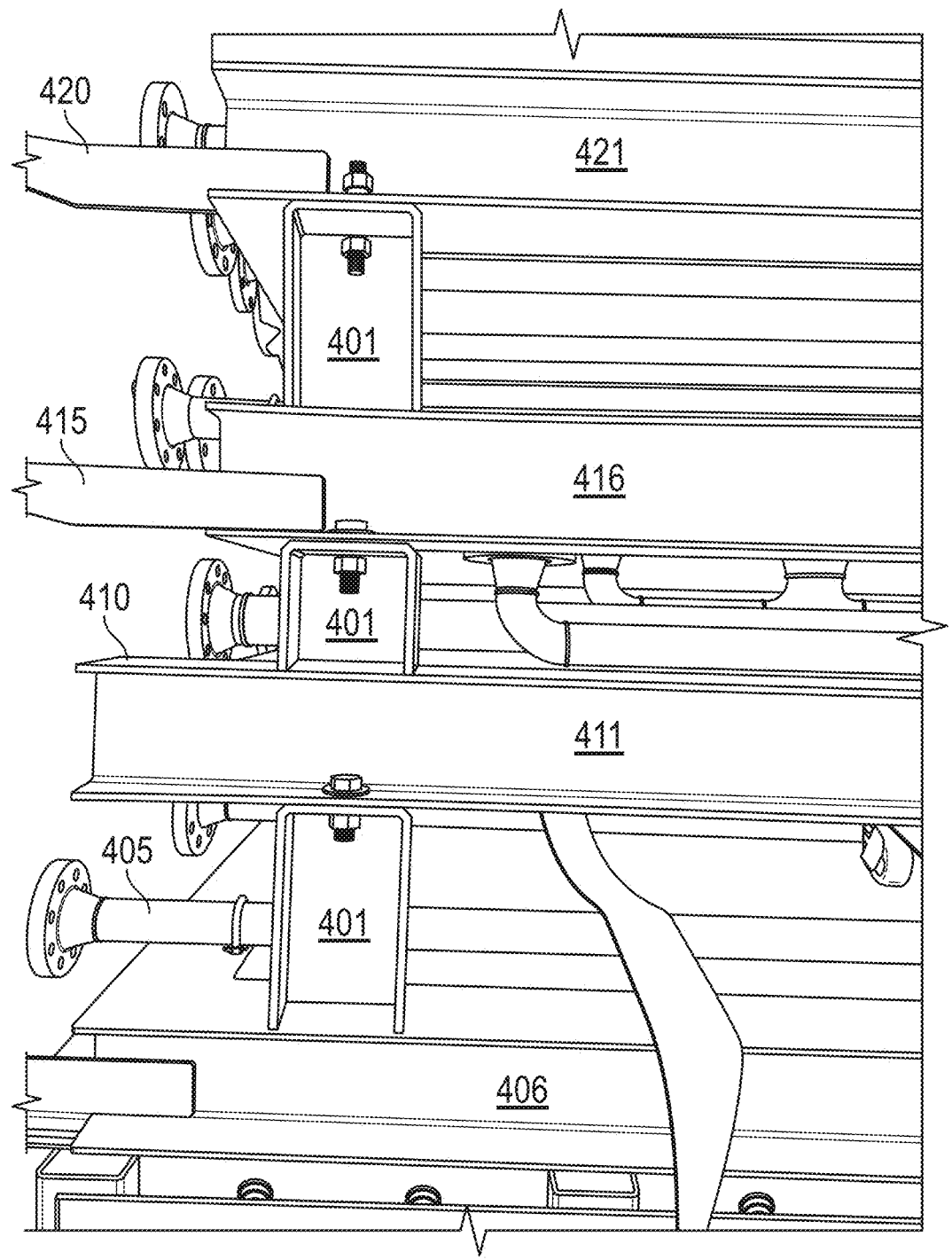
FIG. 19 depicts a section of a stacking system in accordance with an embodiment of the present invention.

FIGS. 17-19 illustrate a further aspect of another embodiment, depicting a stacking system for shipment of multiple pipe racks and other equipment skids (see FIG. 19) that results in reducing the number of trucks needed to transport production system components. As shown in FIGS. 17-19, four pipe racks 405, 410, 415 and 420 are stacked for transport and delivery. Stacking posts 401 have top 402 and bottom 403 plates with bolt holes. The stacking posts 401 are bolted to the pipe rack steel beams 406, 411, 416, and 421 at multiple places along the pipe rack in order to distribute the load. As can be seen in FIG. 19, the stacking posts 41 can be sized as needed to accommodate the multiple pipe racks. By using the stacking system embodiment, multiple pipe racks can be shipped on one truck load, as opposed to four, reducing the cost of shipping and speeding up the time of delivery and setup of the modular production system.

Data Analytics and Neural Networks

In a further aspect of an embodiment, the system includes a control system, such as a DCS, PLC, SCADA, or wireless control system (e.g., wireless instrumentation and control devices that communicate over a wireless network), or a combination of these types of control systems that are operatively in communication with the modular production system's instrumentation, actuators and valves. The control system can be used to monitor and control the operation of the production system. Additionally, the system can be controlled and monitored remotely, and production system data for one or a multitude of production systems is collected, analyzed, and used for benchmarking purposes, as well as optimization and predicting operation of production systems, including separators, to generate and predict production systems operational setpoints, maintenance needs, measurements, and values, including service to the equipment, such as the need to drain sand from the integrated sand separator. Additionally, the need to replace an oversized, or in some cases undersized separator, can also be determined using these systems. For example, and as shown in FIG. 20 and as discussed further below, there is data collection via a computer communication network of production system operating parameters and determined setpoint data for a production system, including the separator systems, wherein using data analytics, artificial intelligence, machine learning and/or neural network methodologies to: predict the subject, a related, or an unrelated production system's performance and/or operational setpoints; generate benchmarking metrics for production systems' operation and maintenance; and/or generate setpoints and anticipated measurement and production system operational values.

Figure 20:
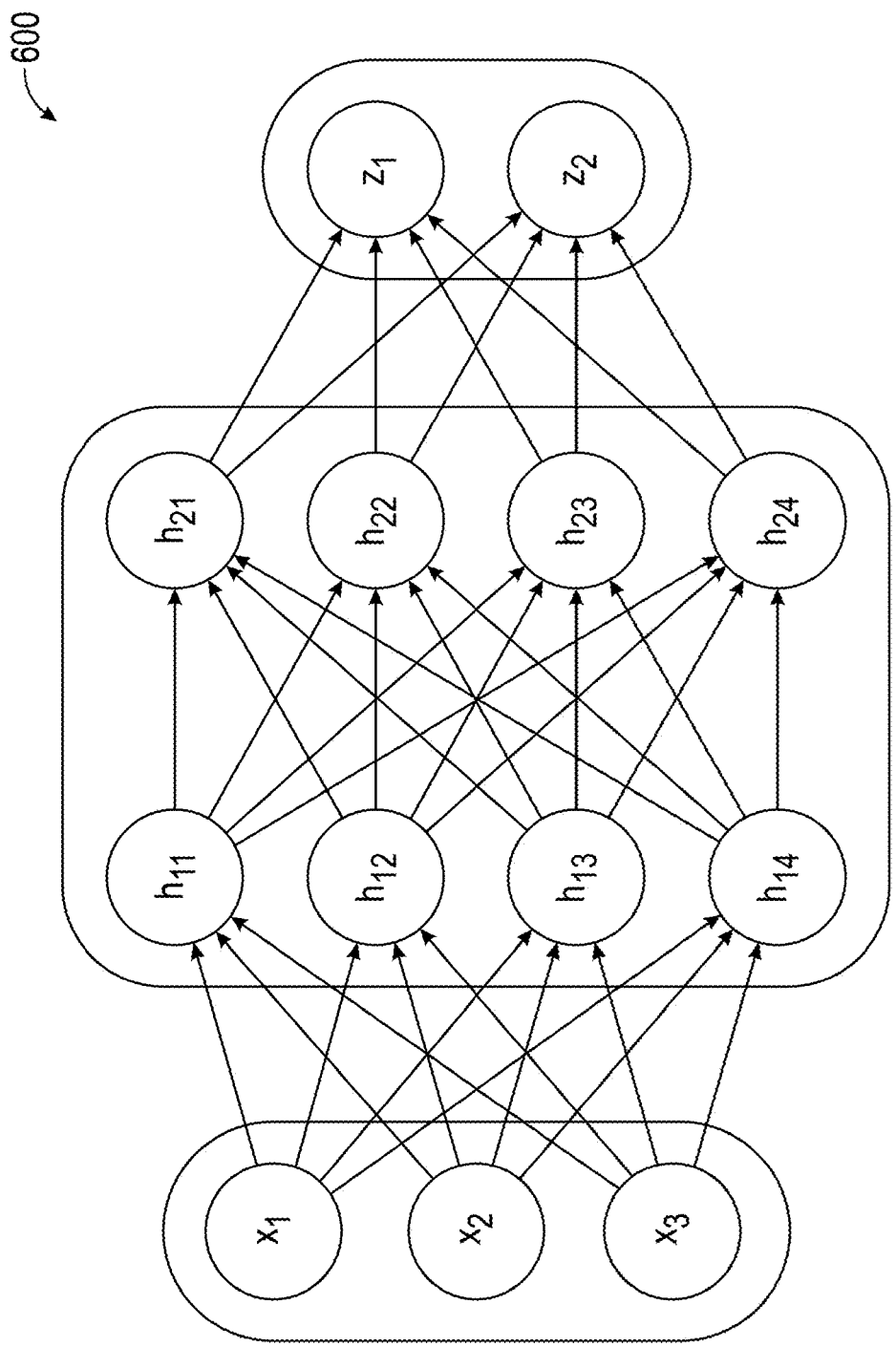
FIG. 20 depicts is a neural network (NN) architecture 600 implemented in an embodiment of the present invention.

FIG. 20 shows an example of a deep neural network (NN) architecture 600 including a matrix of connected neuron processors. The matrix of neural processors is configured as a computation unit that operates as a two-dimensional systolic array. The two-dimensional systolic array includes multiple cells that are configured to identify probabilities for three categories of content. By way of example, the input neurons x1 through x3 are activated through input data and operate as sensors that perceive the input, and are for example in an embodiment of the invention, well production data, such as measurement data that is received from well and separator instrumentation, and can include inlet well fluid flow rate, outlet fluid, including gas flow, oil flow, water flow, system pressures, sand level, water level, and oil level, physical and chemical characteristics of the crude, operating pressure, operating temperature, and rate of throughput, including rate of increase or rate of change of these parameters. Production system can include instrumentation that can measure these parameters, and data from these parameters can be collected using a wireless network in communication with the instruments, and control or monitoring systems.

The middle layers, sometimes referred to as the hidden layers, which include neural processor layers h11 through h14 and h21 through h24, are activated through weighted connections and receive activation data from previous neural processors. For the sake of simplicity, two middle layers are shown although these layers can be multiples of what is shown and the number of layers depends upon the input and how "deep" of an accumulative learning process is required to obtain a reliable result. Some of the neural processors in the middle layers will influence the output by triggering events based upon one or more other events occurring in the middle layer or directly from input data. Depending upon the accuracy and comprehensiveness of the input data, the problem to be solved and how the neural processors are connected, obtaining an output z1 and z2, in order to, for example, predict timing of the need to drain the sand from the high pressure separator. As shown in FIG. 20 the deep neural network 600 is configured to analyze each of the vectors to generate probabilities to determine a final confidence score for the output z1 and z2 that reliable within a degree certain.

Although the apparatuses and methods described herein have been described in detail, it should be understood that various changes, substitutions, and alterations can be made without departing from the spirit and scope of the invention as defined by the following claims. Those skilled in the art may be able to study the exemplar embodiments and identify other ways to practice the invention that are not exactly as described herein. It is the intent of the inventor that variations and equivalents of the invention are within the scope of the claims while the description, abstract and drawings are not to be used to limit the scope of the invention. The invention is specifically intended to be as broad as the claims below and their equivalents.

What is claimed is:

1. A portable oil production alignment module system, comprising:
    a first skid module, comprising a first piping manifold for fluid flow having a first piping manifold connection assembly having at least one first interconnecting flange, and a first set of spaced apart beams on which the first piping manifold is mounted;
    a second skid module that is separable from the first module, comprising a second piping manifold for fluid flow having a second piping manifold connection assembly having at least one second interconnecting flange, and a second set of spaced apart beams on which the second piping manifold is mounted;
    a first alignment beam fork member coupled to at least one of the beams of the first skid module or at least one of the beams of the second skid module, the first alignment beam fork member comprising a first guide plate and a second guide plate, and a first alignment pin disposed between the first and second guide plates;
    a first alignment knife coupled to at least one of the beams of the other skid module; and
    a first separator for separating a hydrocarbon mixture into separate fluid components mounted on at least one of the first or second skid modules, and configured to be connected to either the first piping manifold or the second piping manifold,
    wherein the first skid module and the second skid module are designed such that when the first skid module and the second skid module are pushed together, the first skid module and the second skid module are aligned using the first alignment fork member and the first alignment knife such that the first interconnecting flange and the second interconnecting flange are pushed up leaving a gap in order to slide in a gasket in the gap to connect the first interconnecting flange to the second interconnecting flange.

2. The portable oil production alignment module system of claim 1, wherein the first alignment knife further comprises a first alignment aperture.

3. The portable oil production alignment module system of claim 1, further comprising:
the first skid module having a first conduit containing a first set of conductors capable of carrying electrical signals for power, signal, measurement or control to the module system;
the second skid module having a second conduit containing a second set of conductors capable of carrying electrical signals for power, signal, measurement or control to the module system, wherein the first set of conductors is removably connectable to the second set of conductors via an interconnection of the first and second conduits.

4. The portable oil production alignment module system of claim 3, further comprising:
a first electrical terminator that is removably connectable to the first set of conductors; and
a second electrical terminator that is removably connectable to the second set of conductors, wherein the first electrical terminator is removably connectable to the second electrical terminator.

5. The portable oil production alignment module system of claim 1, further comprising:
the first skid module having a first pneumatic manifold having a first pneumatic manifold connection assembly; and
the second skid module having a second pneumatic manifold having a second pneumatic manifold connection assembly, wherein the first and second pneumatic manifolds are removably connectable via an interconnection of the first and second pneumatic manifold connection assemblies.

6. The portable oil production alignment module system of claim 1, wherein the first separator comprises:
a pressure vessel having an interior cavity configured to receive a production stream comprising oil, gas, water and solids;
an inlet nozzle connected to said vessel and in communication with the interior cavity through which the production stream enters the vessel;
a first vertical plate attached near a top surface of an interior wall of the vessel, said first vertical plate extending vertically downward toward a bottom surface of the vessel, wherein the first vertical plate being located near the inlet nozzle is operative to direct the production stream in a vertical path towards the toward a bottom surface of the vessel;
a second vertical plate attached to the bottom surface of the interior wall of the vessel, said second vertical plate extending upward from the bottom surface of the vessel, the second vertical plate being located adjacent to and a distance behind the first vertical plate;
a first outlet nozzle connected to said vessel and in communication with the interior cavity for removal of solids from the production stream, the first outlet nozzle extending from a bottom wall of the vessel between the first vertical plate and the second vertical plate;
a second outlet nozzle connected to said vessel and in communication with the interior cavity for removal of a first fluid from the production stream, the second outlet nozzle extending from the bottom wall of the vessel, the second outlet nozzle being located behind the second vertical plate;
a third vertical plate attached to the bottom surface of the interior wall of the vessel, said third vertical plate extending upward from the bottom surface of the vessel, the third vertical plate being located behind the second outlet nozzle, wherein a top of the third vertical plate extends above a top of the second vertical plate;
a third outlet nozzle connected to said vessel and in communication with the interior cavity, said third outlet nozzle extending from the bottom wall of the vessel for removing a second fluid from the production stream, the third outlet nozzle being located behind the third vertical plate; and
a fourth outlet nozzle connected to said vessel and in communication with the interior cavity for removal of a gas, said fourth outlet nozzle extending from an upper wall of the vessel.

7. The portable oil production alignment module system of claim 6, wherein the first vertical plate is an inlet diverter that is designed to cause at least a portion of the solid particles to separate from the production stream when the production stream makes impact with the inlet diverter.

8. The portable oil production alignment module system of claim 6, further comprising a level device capable of measuring a level of solid particles in the first separator.

9. The portable oil production alignment module system of claim 8, wherein the level device is selected from a group consisting of a sonar, radar, ultrasonic, or capacitance level device.

10. The portable oil production alignment module system of claim 1, wherein the skid module containing the first separator is a replacement skid module comprising a replacement separator.

11. The portable oil production alignment module system of claim 1, wherein the first separator is connected to the first piping manifold.

12. The portable oil production alignment module system of claim 1, wherein the second separator is connected to the second piping manifold.

13. The portable oil production alignment module system of claim 1, wherein the first skid module and/or the second skid module further comprising pipe racks, one or more vapor recovery tower, one or more flare knockout drum, one or more flare stack, one or more fuel gas scrubber, one or more multi well separator, one or more high pressure test separator, one or more low pressure test separator, one or more line heater, one or more heater treater, one or more gas dehydration unit, one or more gas powered unit, one or more combustors, one or more slug catcher, one or bulk separator, one or more sand separator, one or more methanol injector, one or more pig launcher, one or more pig receiver, safety equipment, electrical equipment, a SCADA system, or a combination thereof located thereon.

14. The portable oil production alignment module system of claim 1, wherein the first skid module and/or the second skid module is removable or replaceable with another skid module.

15. The portable oil production alignment module system of claim 10, wherein the replacement separator is smaller or larger than the separator it replaced.

16. The portable oil production alignment module system of claim 15, wherein the replacement skid module is capable of installation without the need for welding at a well site.

17. The portable oil production alignment module system of claim 10, further comprising:
the first skid module having a first conduit containing a first set of conductors capable of carrying electrical signals for power, or control of instrumentation, actuators and valves of the module system;
the second skid module having a second conduit containing a second set of conductors capable of carrying electrical signals for power, or control of instrumentation, actuators and valves of the module system, wherein the first set of conductors is removably connectable to the second set of conductors via an interconnection of the first and second conduits.

18. The portable oil production alignment module system of claim 17, further comprising:
a first electrical terminator that is removably connectable to the first set of conductors; and
a second electrical terminator that is removably connectable to the second set of conductors, wherein the first electrical terminator is removably connectable to the second electrical terminator.

19. The portable oil production alignment module system of claim 10, further comprising:
the first skid module having a first pneumatic manifold having a first pneumatic manifold connection assembly;
the second skid module having a second pneumatic manifold having a second pneumatic manifold connection assembly, wherein the first and second pneumatic manifolds are removably connectable via an interconnection of the first and second pneumatic manifold connection assemblies.

20. A method for providing a portable oil production alignment modular system, comprising:
providing a first skid module, comprising a first piping manifold for fluid flow having a first piping manifold connection assembly having at least one first interconnecting flange, and a first set of spaced apart beams on which the first piping manifold is mounted;
providing a second skid module that is separable from the first module, comprising a second piping manifold for fluid flow having a second piping manifold connection assembly having at least one second interconnecting flange, and a second set of spaced apart beams on which the second piping manifold is mounted;
providing a first alignment beam fork member coupled to at least one of the beams of the first skid module or at least one of the beams of the second skid module, the first alignment beam fork member comprising a first guide plate and a second guide plate, and a first alignment pin disposed between the first and second guide plates;
providing a first alignment knife coupled to at least one of the beams of the other skid module; and
providing a first separator for separating a hydrocarbon mixture into separate fluid components mounted on at least one of the first or second skid modules,
wherein the first skid module and the second skid module are designed such that when the first skid module and the second skid module are pushed together, the first skid module and the second skid module are aligned using the first alignment fork member and the first alignment knife such that the first interconnecting flange and the second interconnecting flange are pushed up leaving a gap in order to slide in a gasket in the gap to connect the first interconnecting flange to the second interconnecting flange.

21. The method for providing a portable oil production alignment system of claim 20, wherein the first alignment knife further comprises a first alignment aperture.

22. The method for providing a portable oil production alignment module system of claim 20, further comprising replacing the skid module containing the first separator with a replacement skid module comprising a replacement separator and at least one of the first alignment beam fork member or the first alignment knife, wherein the replacement skid module replaces the skid module containing the separator by engagement of the first alignment beam fork member with the first alignment knife.

23. The method for providing a portable oil production alignment module system of claim 20, further comprising:
providing a first conduit containing a first set of conductors capable of carrying electrical signals on the first skid module;
providing a second conduit containing a second set of conductors capable of carrying electrical signals on the second skid module, wherein the first set of conductors is removably connectable to the second set of conductors via an interconnection of the first and second conduits.

24. The method for providing a portable oil production alignment module system of claim 23, further comprising:
providing a first electrical terminator that is removably connectable to the first set of conductors; and
providing a second electrical terminator that is removably connectable to the second set of conductors, wherein the first electrical terminator is removably connectable to the second electrical terminator.

* * * * *